US010327246B2

United States Patent
Seok

(10) Patent No.: US 10,327,246 B2
(45) Date of Patent: Jun. 18, 2019

(54) METHOD AND APPARATUS FOR WIDE BANDWIDTH PPDU TRANSMISSION IN A HIGH EFFICIENCY WIRELESS LAN

(71) Applicant: NEWRACOM, Inc., Lake Forest, CA (US)

(72) Inventor: Yongho Seok, Irvine, CA (US)

(73) Assignee: NEWRACOM, Inc., Lake Forest, CA (US)

( * ) Notice: Subject to any disclaimer, the term of this patent is extended or adjusted under 35 U.S.C. 154(b) by 0 days.

(21) Appl. No.: 15/880,307

(22) Filed: Jan. 25, 2018

(65) Prior Publication Data

US 2018/0160429 A1 Jun. 7, 2018

Related U.S. Application Data

(63) Continuation-in-part of application No. 14/983,247, filed on Dec. 29, 2015, now Pat. No. 9,917,933.
(Continued)

(51) Int. Cl.
*H04W 72/04* (2009.01)
*H04L 29/06* (2006.01)
*H04W 74/08* (2009.01)
*H04L 27/26* (2006.01)
*H04B 7/0452* (2017.01)
*H04L 1/00* (2006.01)
*H04L 5/00* (2006.01)

(52) U.S. Cl.
CPC ..... *H04W 72/0453* (2013.01); *H04L 27/2627* (2013.01); *H04L 27/2649* (2013.01); *H04L 69/22* (2013.01); *H04W 74/0816* (2013.01); *H04B 7/0452* (2013.01); *H04L 1/00* (2013.01); *H04L 5/003* (2013.01); *H04L 27/2602* (2013.01)

(58) Field of Classification Search
CPC .......... H04W 72/0453; H04W 74/0816; H04L 69/22; H04L 27/2627; H04L 1/00; H04L 5/033; H04L 27/2602; H04B 7/0452
USPC ................ 370/208, 471, 473, 474, 476, 203
See application file for complete search history.

(56) References Cited

U.S. PATENT DOCUMENTS 8,565,065 B2  10/2013  Cheng et al.
8,644,281 B2  2/2014  Seok et al.
(Continued)

OTHER PUBLICATIONS

IEEE P802.11ah/D5.0: "Part 11: Wireless LAN Medium Access Control (MAC) and Physical Layer (PHY) Specifications, Amendment 2: Sub 1 GHz License Exempt Operation," IEEE Draft Standard for Information technology—Telecommunications and information exchange between systems, Local and metropolitan area networks—Specific requirements, Mar. 2015, 632 pages.
(Continued)

*Primary Examiner* — Brenda H Pham
(74) *Attorney, Agent, or Firm* — NDWE LLP

(57) ABSTRACT

Methods and apparatus for a wideband Physical layer Protocol Data Unit (PPDU) transmission in a High Efficiency WLAN (HEW) include a method for transmitting a Physical layer Protocol Data Unit (PPDU) in a wireless local area network. The method may further include performing a stream parsing of data bit streams to output blocks, determining whether to perform a segment parsing of the blocks based on a predetermined condition to output frequency subblocks, performing a constellation mapping of the blocks or the frequency subblocks, and transmitting the PPDU.

20 Claims, 27 Drawing Sheets

Related U.S. Application Data

(60) Provisional application No. 62/098,256, filed on Dec. 30, 2014, provisional application No. 62/264,559, filed on Dec. 8, 2015.

(56) References Cited

U.S. PATENT DOCUMENTS

| | | | |
|---|---|---|---|
| 9,497,057 | B2 | 11/2016 | You et al. |
| 2007/0196072 | A1 | 8/2007 | Zhou et al. |
| 2009/0067378 | A1 | 3/2009 | Luo et al. |
| 2010/0246541 | A9 | 9/2010 | Kim |
| 2012/0069804 | A1 | 3/2012 | Kim et al. |
| 2012/0076219 | A1 | 3/2012 | Srinivasa et al. |
| 2012/0230448 | A1 | 9/2012 | Kang et al. |
| 2012/0263156 | A1* | 10/2012 | Abraham ............... H04L 5/0023 370/338 |
| 2015/0146653 | A1* | 5/2015 | Zhang .................. H04L 5/0041 370/329 |
| 2016/0056943 | A1 | 2/2016 | Stacey et al. |
| 2016/0128099 | A1 | 5/2016 | Liu et al. |
| 2017/0272295 | A1* | 9/2017 | Lee .......................... H04L 5/00 |

OTHER PUBLICATIONS

IEEE Std 802.11-2012: "Part 11: Wireless LAN Medium Access Control (MAC) and Physical Layer (PHY) Specifications," IEEE Standard for Information technology—Telecommunications and information exchange between systems, Local and metropolitan area networks—Specific requirements, Mar. 29, 2012, 2793 pages.

IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.

IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunications and information exchange between systems, Local and metropolitan area networks—Specific requirements, Dec. 18, 2013, 425 pages.

IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.

IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.

Non-Final Office Action from U.S. Appl. No. 14/983,247, dated Jun. 23, 2017, 22 pages.

Notice of Allowance from U.S. Appl. No. 14/983,247, dated Oct. 27, 2017, 12 pages.

\* cited by examiner

| L-STF | L-LTF | L-SIG | HE-SIG-A | HE-STF | HE-LTF | HE-SIG-B | HE-LTF | HE-LTF | HE-LTF | HE-SIG-C | PSDU(AP TO STA6) |
|---|---|---|---|---|---|---|---|---|---|---|---|
| | | | | HE-STF | HE-LTF | HE-SIG-B | HE-LTF | HE-LTF | HE-LTF | HE-SIG-C | PSDU(AP TO STA5) |
| | | | | HE-STF | HE-LTF | HE-SIG-B | HE-LTF | HE-LTF | HE-LTF | HE-SIG-C | PSDU(AP TO STA3, STA4) |
| | | | | HE-STF | HE-LTF | HE-SIG-B | HE-LTF | HE-LTF | HE-LTF | HE-SIG-C | PSDU(AP TO STA1, STA2) |

FIG. 15

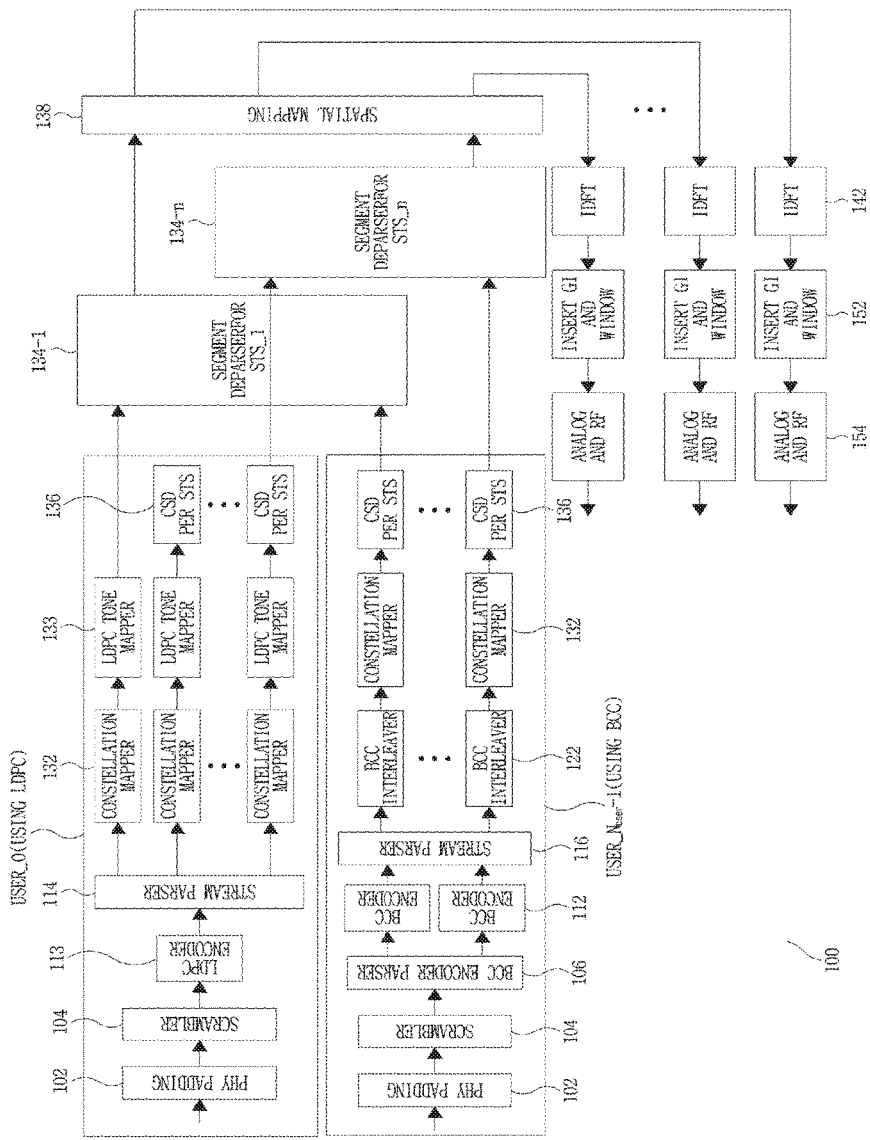

METHOD AND APPARATUS FOR WIDE BANDWIDTH PPDU TRANSMISSION IN A HIGH EFFICIENCY WIRELESS LAN

CROSS-REFERENCE TO RELATED APPLICATIONS

This application is a continuation of U.S. application Ser. No. 14/983,247, filed Dec. 29, 2015, which application claims the benefits of U.S. Provisional Application No. 62/098,256, filed on Dec. 30, 2014, and U.S. Provisional Application No. 62/264,559, filed on Dec. 8, 2015, which are hereby incorporated by reference as if fully set forth herein.

BACKGROUND

Technical Field

The present disclosure relates to Wireless Local Area Networks (WLANs), and more particularly, to a method and apparatus for a wideband Physical layer Protocol Data Unit (PPDU) transmission in a High Efficiency WLAN (HEW).

Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

In recent times, to support increased numbers of devices supporting WLAN, such as smartphones, more Access Points (APs) have been deployed. Despite increase in use of WLAN devices supporting the Institute of Electrical and Electronics Engineers (IEEE) 802.11ac standard, that provide high performance relative to WLAN devices supporting the legacy IEEE 802.11g/n standard, a WLAN system supporting higher performance is required due to WLAN users' increased use of high volume content such as a ultra high definition video. Although a conventional WLAN system has aimed at increase of bandwidth and improvement of a peak transmission rate, actual users thereof could not feel drastic increase of such performance.

In a task group called IEEE 802.11ax, High Efficiency WLAN (HEW) standardization is under discussion. The HEW aims at improving performance felt by users demanding high-capacity, high-rate services while supporting simultaneous access of numerous stations in an environment in which a plurality of APs is densely deployed and coverage areas of APs overlap.

However, there is no specified method for a wideband PPDU transmission in a HEW.

SUMMARY

The present disclosure describes embodiments of a method and apparatus for a wideband PPDU transmission in a HEW.

The embodiments contemplated by the present disclosure are not limited to the foregoing descriptions, and additional embodiments will become apparent to those having ordinary skill in the pertinent art to the present disclosure based upon the following descriptions.

In an aspect of the present disclosure, a method for transmitting a Physical layer Protocol Data Unit (PPDU) in a wireless local area network may be provided. The method may include performing a stream parsing of data bit streams to output blocks; determining whether to perform a segment parsing of the blocks based on a predetermined condition to output frequency subblocks; and performing a constellation mapping of the blocks or the frequency subblocks and transmitting the PPDU.

In another aspect of the present disclosure, a method for receiving a Physical layer Protocol Data Unit (PPDU) in a wireless local area network may be provided. The method may include performing a Space-Time Block Coding (STBC) decoding of the PPDU to output blocks; determining whether to perform a segment parsing of the blocks based on a predetermined condition to output frequency subblocks; and performing a constellation demapping of the blocks or the frequency subblocks.

In another aspect of the present disclosure, a transmitting apparatus for transmitting a Physical layer Protocol Data Unit (PPDU) in a wireless local area network may be provided. The transmitting apparatus may include a baseband processor, a Radio Frequency (RF) transceiver, a memory, etc. The baseband processor may be configured to perform stream parsing of data bit streams to output blocks; determine whether to perform a segment parsing of the blocks based on a predetermined condition to output frequency subblocks; perform a constellation mapping of the blocks or the frequency subblocks; and transmitting the PPDU.

In another aspect of the present disclosure, a receiving apparatus for receiving a Physical layer Protocol Data Unit (PPDU) in a wireless local area network may be provided. The receiving apparatus may include a baseband processor, an RF transceiver, a memory, etc. The baseband processor may be configured to perform a Space-Time Block Coding (STBC) decoding of the PPDU to output blocks; determine whether to perform a segment parsing of the blocks based on a predetermined condition to output frequency subblocks; and perform a constellation demapping of the blocks or the frequency subblocks.

In another aspect of the present disclosure, a non-transitory computer-readable medium having instructions executable for a transmitting device to transmit a Physical layer Protocol Data Unit (PPDU) in a wireless local area network may be provided. The executable instructions may cause the transmitting device to perform a stream parsing of data bit streams to output blocks; determine whether to perform a segment parsing of the blocks based on a predetermined condition to output frequency subblocks; perform a constellation mapping of the blocks or the frequency subblocks; and transmitting the PPDU.

In another aspect of the present disclosure, a non-transitory computer-readable medium having instructions executable for a receiving device to receive a Physical layer Protocol Data Unit (PPDU) in a wireless local area network may be provided. The executable instructions may cause the receiving device to perform a Space-Time Block Coding (STBC) decoding of the PPDU to output blocks; determine whether to perform a segment parsing of the blocks based on a predetermined condition to output frequency subblocks; and perform a constellation demapping of the blocks or the frequency subblocks.

It is to be understood that the foregoing summarized features are example aspects of the following detailed description of the present disclosure and are not intended to limit the scope of the present disclosure.

According to the present disclosure, a method and apparatus for a wideband PPDU transmission in a HEW can be provided.

The advantages of the present disclosure are not limited to the foregoing descriptions, and additional advantages will become apparent to those having ordinary skill in the pertinent art to the present disclosure based upon the following descriptions.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 11 depicts the starting and ending points of a High Efficiency Long Training Field (HE-LTF) field in an HE PPDU frame format according to the present disclosure.

FIG. 12 depicts a High Efficiency SIGnal B (HE-SIG-B) field and a High Efficiency SIGnal C (HE-SIG-C) field in the HE PPDU frame format according to the present disclosure.

FIG. 15 depicts another example HE PPDU frame format according to the present disclosure.

FIG. 27 is a block diagram of a transmitting signal processing unit for OFDMA PPDU transmission according to the present disclosure.

DETAILED DESCRIPTION

Figure 1:
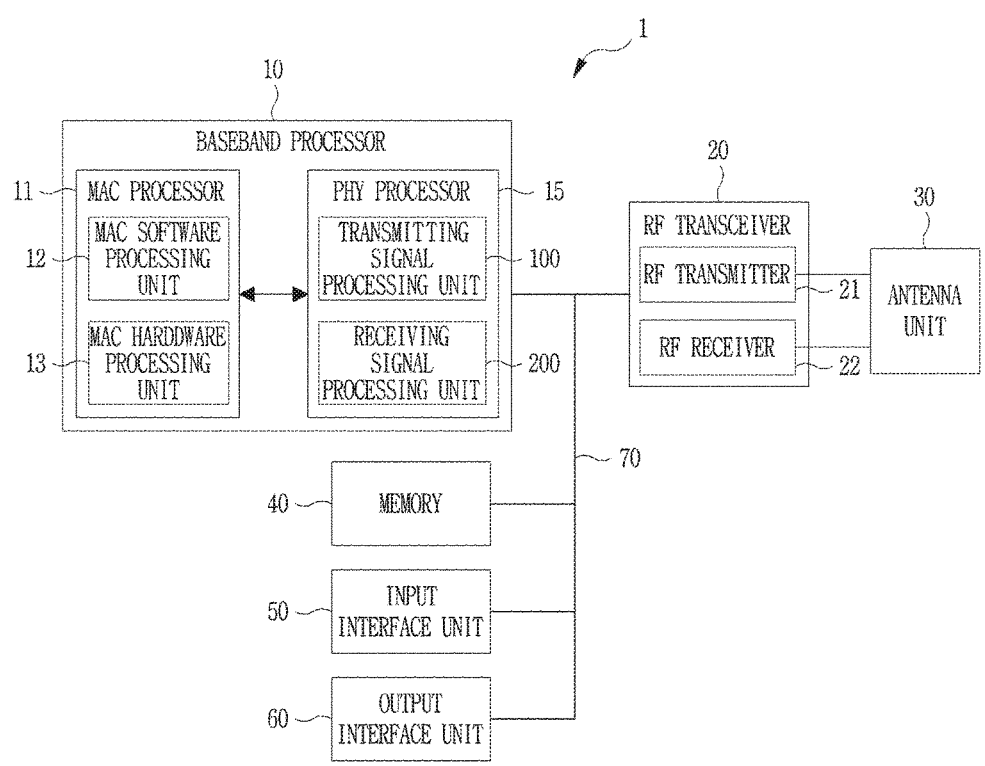
FIG. 1 is a block diagram of a Wireless Local Area Network (WLAN) device.

In the following detailed description, certain embodiments of the present disclosure have been shown and described, by way of illustration. As those skilled in the art would realize, the described embodiments may be modified in various different ways, without departing from the spirit or scope of the present disclosure. Accordingly, the drawings and description are to be regarded as illustrative in nature and not restrictive. Like reference numerals designate like elements throughout the present disclosure.

In a Wireless Local Area network (WLAN), a Basic Service Set (BSS) includes a plurality of WLAN devices. A WLAN device may include a Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as a STA or may be collectively referred to as STAs. However, for ease of description herein, only the non-AP STAs may be referred to herein as STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, which may be or may include a non-transitory computer-readable medium, an input interface unit 50, an output interface unit 60, and a bus 70.

The baseband processor 10 may be simply referred to as a processor, and may perform baseband signal processing described in the present disclosure, and includes a MAC processor (or MAC entity) 11 and a PHY processor (or PHY entity) 15.

In an embodiment of the present disclosure, the MAC processor 11 may include a MAC software processing unit 12 and a MAC hardware processing unit 13. The memory 40 may store software or machine-executable instructions (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, embodiments of the MAC processor 11 are not limited to this distribution of functionality.

The PHY processor 15 includes a transmitting (TX) signal processing unit 100 and a receiving (RX) signal processing unit 200.

The baseband processor 10, the RF transceiver 20, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple Input Multiple Output (MIMO) or Multi-User MIMO (MU-MIMO) is used, the antenna unit 30 may include a plurality of antennas.

Figure 2:
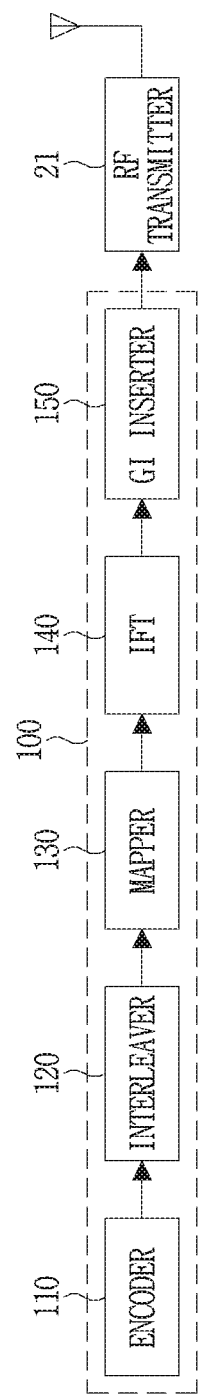
FIG. 2 is a schematic block diagram of an example transmitting signal processing unit in a WLAN.

FIG. 2 is a schematic block diagram of an example transmitting signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 100 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
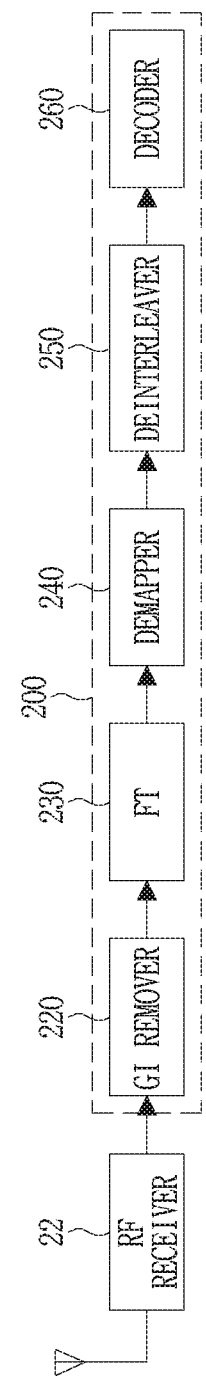
FIG. 3 is a schematic block diagram of an example receiving signal processing unit in a WLAN.

FIG. 3 is a schematic block diagram of an example receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into one or more symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may use/include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, or colloquially as a 'listen before talk' access mechanism. According to the CSMA/CA mechanism, an AP and/or a STA may sense a medium or a channel for a predetermined time before starting transmission, that is, the AP and/or the STA may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in less collisions.

Figure 4:
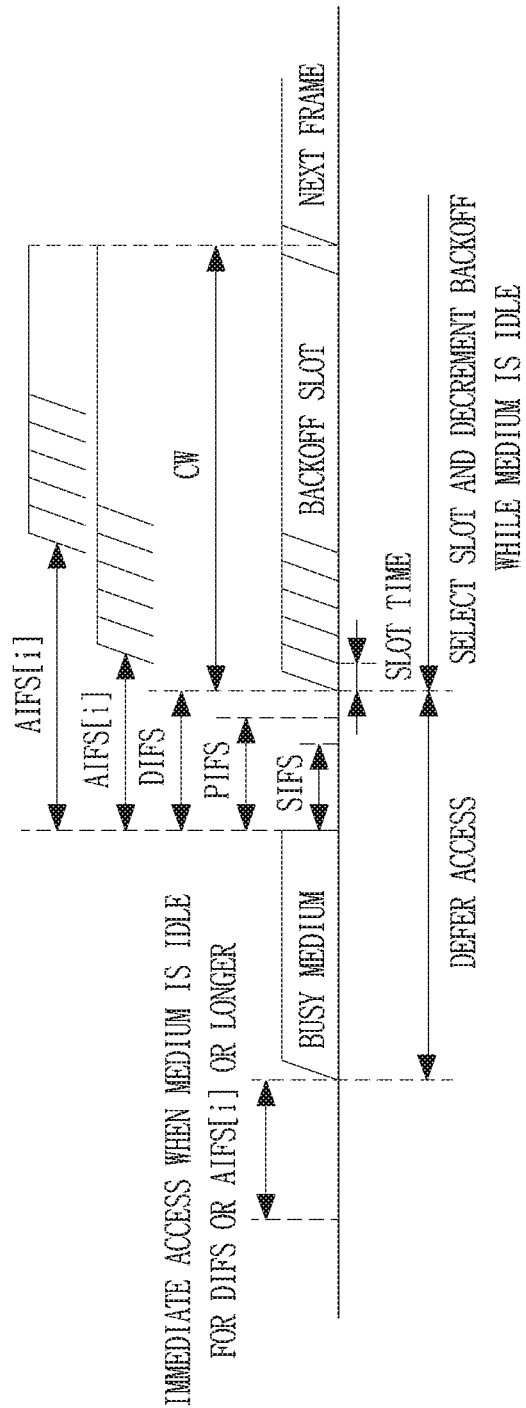
FIG. 4 depicts a relationship between InterFrame Spaces (IFSs).

FIG. 4 depicts a relationship between InterFrame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to a previous frame, the WLAN device transmits the control frame after performing backoff if the DIFS has elapsed. In case that the control frame is a response frame to a previous frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i] (i is determined based on AC) has elapsed. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium is idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempts transmission. The random backoff count is determined based on a Contention Window (CW) parameter and the medium is monitored continuously during countdown of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
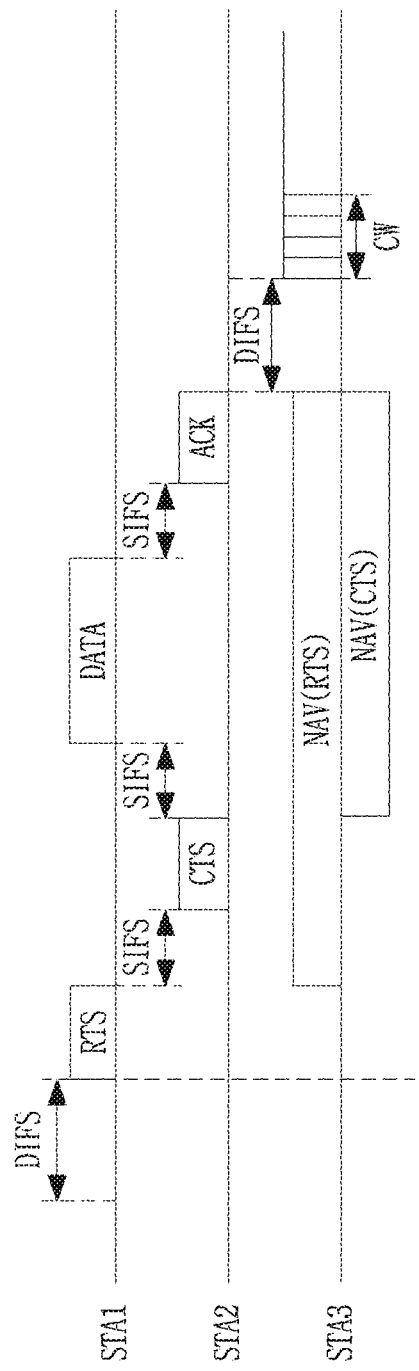
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
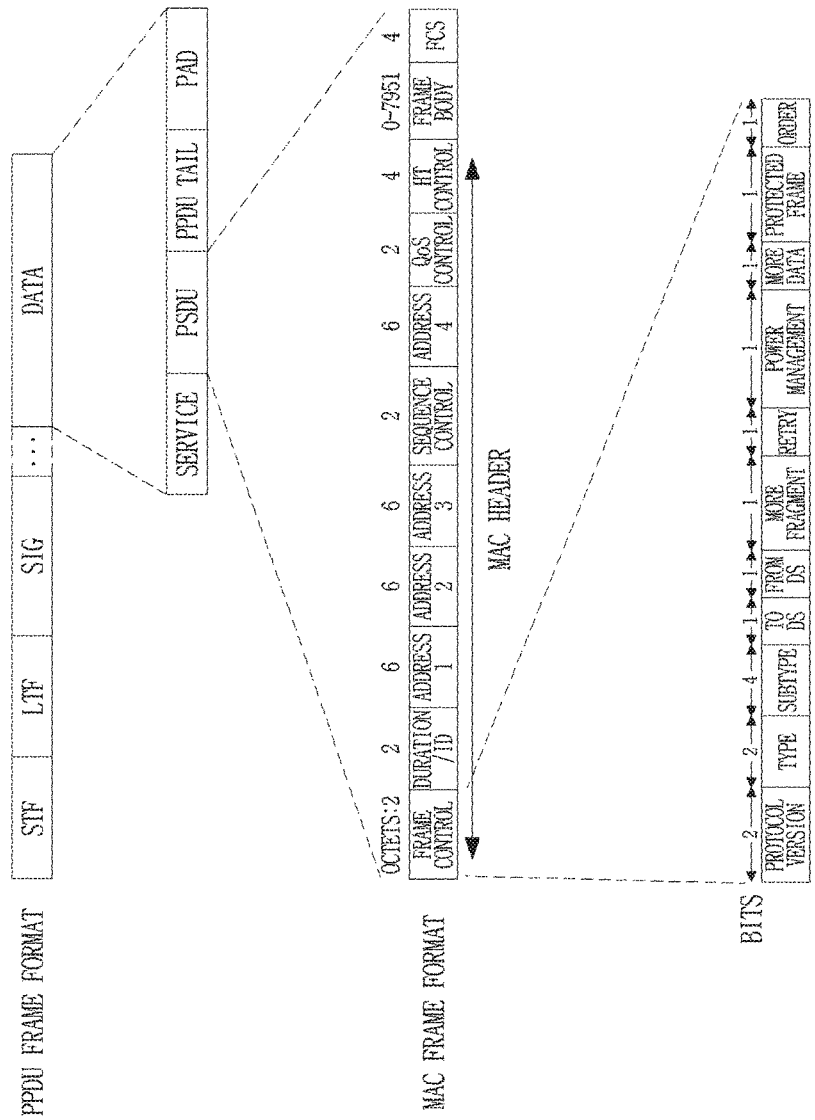
FIG. 6 depicts an example frame structure in a WLAN system.

FIG. 6 depicts an example frame structure in a WLAN system.

PHY layer may prepare for transmission of a MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. Some of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification, which is hereby incorporated by reference.

The Frame Control field of the MAC header may include Protocol Version, Type, Subtype, To Distribution System (DS), From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present disclosure defines a new PPDU frame format for the IEEE 802.1 lax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present disclosure, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
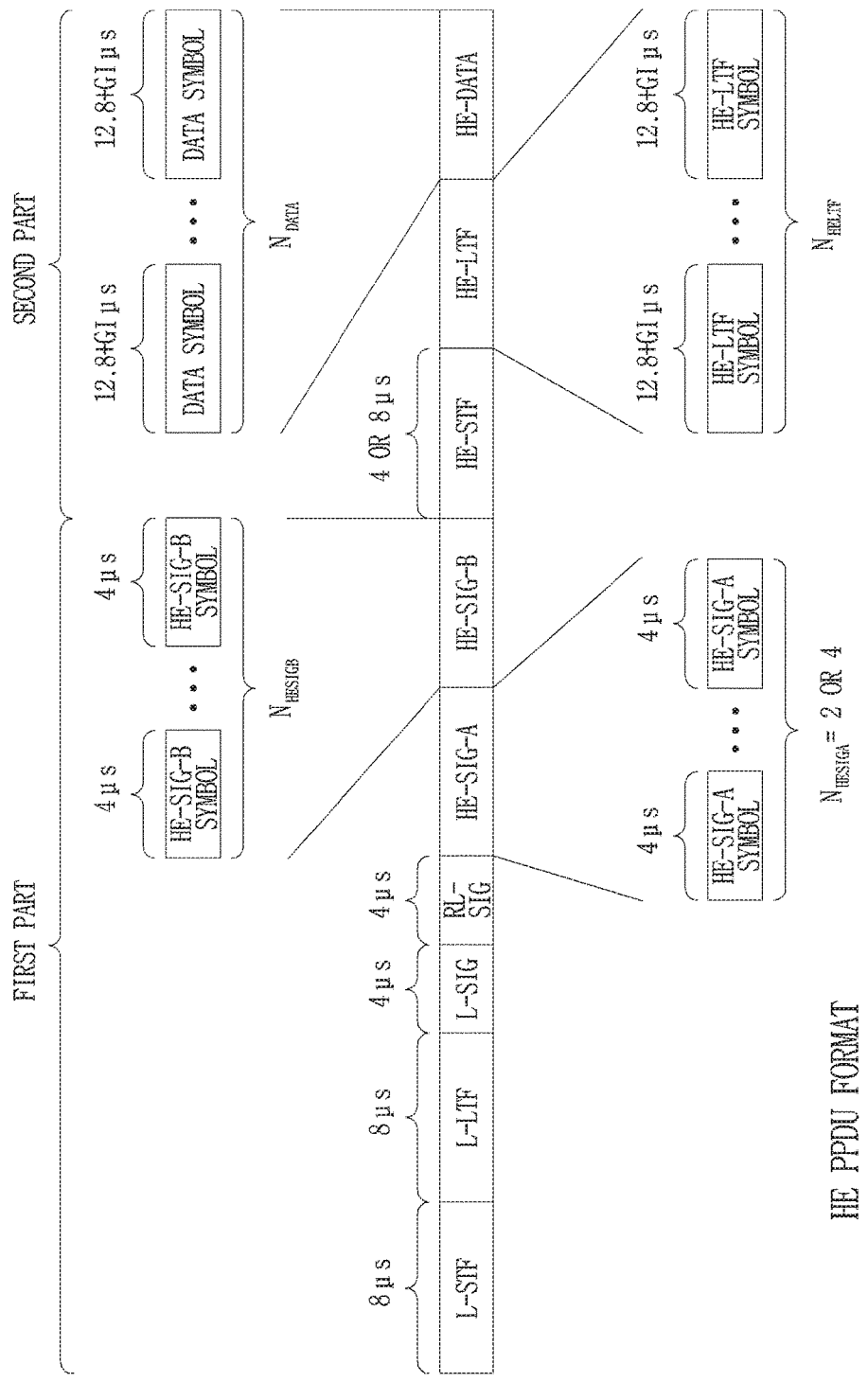
FIG. 7 depicts an example HE PPDU frame format.

FIG. 7 depicts an example HE PPDU frame format.

A transmitting STA may generate a PPDU frame according to the HE PPDU frame format as illustrated in FIG. 7 and transmit the PPDU frame to a receiving STA. The receiving STA may receive, detect, and process the PPDU.

The HE PPDU frame format may broadly include two parts: the first part including an L-STF field, an L-LTF field, an L-SIG field, a Repeated L-SIG (RL-SIG) field, an HE-SIG-A field, and an HE-SIG-B field and the second part including an HE-STF field, an HE-LTF field, and an HE-DATA field. 64-FFT based on a channel bandwidth of 20 MHz may be applied to the first part and a basic subcarrier spacing of 312.5 kHz and a basic DFT period of 3.2 μs may be included in the first part. 256-FFT based on a channel bandwidth of 20 MHz may be applied to the second part and a basic subcarrier spacing of 75.125 kHz and a basic DFT period of 12.8 μs may be included in the second part.

The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols.

A detailed description of the fields included in the HE PPDU frame format is given in Table I.

TABLE I

| Element | definition | duration | DFT period | GI | Subcarrier spacing | Description |
|---|---|---|---|---|---|---|
| Legacy(L)-STF | Non-high throughput(HT) Short Training field | 8 μs | — | — | equivalent to 1,250 kHz | L-STF of a non-trigger-based PPDU has a periodicity of 0.8 μs with 10 periods. |
| L-LTF | Non-HT Long Training field | 8 μs | 3.2 μs | 1.6 μs | 312.5 kHz | |
| L-SIG | Non-HT SIGNAL field | 4 μs | 3.2 μs | 0.8 μs | 312.5 kHz | |

TABLE I-continued

| Element | definition | duration | DFT period | GI | Subcarrier spacing | Description |
|---|---|---|---|---|---|---|
| RL-SIG | Repeated Non-HT SIGNAL field | 4 μs | 3.2 μs | 0.8 μs | 312.5 kHz | |
| HE-SIG-A | HE SIGNAL A field | $H_{HESIGA}$ * 4 μs | 3.2 μs | 0.8 μs | 312.5 kHz | HE-SIG-A is duplicated on each 20 MHz segment after the legacy preamble to indicate common control information. $N_{HESIGA}$ means the number of OFDM symbols of the HE-SIG-A field and is equal to 2 or 4. |
| HE-SIG-B | HE SIGNAL B field | $H_{HESIGB}$ * 4 μs | 3.2 μs | 0.8 μs | 312.5 kHz | $N_{HESIGB}$ means the number of OFDM symbols of the HE-SIG-B field and is variable. DL MU packet contains HE-SIG-B. SU packets and UL Trigger based packets do not contain HE-SIG-B. |
| HE-STF | HE Short Training field | 4 or 8 μs | — | — | non-trigger-based PPDU: (equivalent to) 1,250 kHz; trigger-based PPDU: (equivalent to) 625 kHz | HE-STF of a non-trigger-based PPDU has a periodicity of 0.8 μs with 5 periods. A non-trigger-based PPDU is not sent in response to a trigger frame. The HE-STF of a trigger-based PPDU has a periodicity of 1.6 μs with 5 periods. A trigger-based PPDU is an UL PPDU sent in response to a trigger frame. |
| HE-STF | HE Long Training field | $H_{HELTF}$ * (DTF period + GI) μs | 2xLTF: 6.4 μs 4xLTF: 12.8 μs | supports 0.8, 1.6, 3.2 μs | 2xLTF: (equivalent to) 156.25 kHz; 4xLTF: 78.125 kHz | HE PPDU shall support 2xLTF mode and 4xLTF mode. In the 2xLTF mode, HE-LTF symbol excluding GI is equivalent to modulating every other tone in an OFDM symbol of 12.8 μs excluding GI, and then removing the second half of the OFDM symbol in time domain. $N_{HELTF}$ means the number of HE-LTF symbols and is equal to 1, 2, 4, 6, 8. |
| HE-DATA | HE DATA field | $N_{DATA}$ * (DTF period + GI) μs | 12.8 μs | supports 0.8, 1.6, 3.2 μs | 78.125 kHz | $N_{DATA}$ means the number of HE data symbols. |

L-STF is a non-HT Short Training field and may have a duration of 8 μs and a subcarrier spacing equivalent to 1250 kHz. L-STF of a PPDU which is not based on a trigger may have a periodicity of 0.8 μs with 10 periods. Herein, the trigger corresponds to scheduling information for UL transmission.

L-LTF is a non-HT Long Training field and may have a duration of 8 μs, a DFT period of 3.2 μs, a Guard Interval (GI) of 1.6 μs, and a subcarrier spacing of 312.5 kHz.

L-SIG is a non-HT SIGNAL field and may have a duration of 4 μs, a DFT period of 3.2 μs, a GI of 0.8 μs, and a subcarrier spacing of 312.5 kHz.

RL-SIG is a Repeated Non-HT SIGNAL field and may have a duration of 4 μs, a DFT period of 3.2 μs, a GI of 0.8 μs, and a subcarrier spacing of 312.5 kHz.

L-STF, L-LTF, L-SIG, and RL-SIG may be called legacy preambles.

HE-SIG-A is an HE SIGNAL A field and may have a duration of $N_{HESIGA}$*4 μs, a DFT period of 3.2 μs, a GI of 0.8 μs, and a subcarrier spacing of 312.5 kHz. HE-SIG-A may be duplicated on each 20 MHz segment after the legacy preambles to indicate common control information. $N_{HESIGA}$ represents the number of OFDM symbols of the HE-SIG-A field and may have a value of 2 or 4.

HE-SIG-B is an HE SIGNAL B field and may have a duration of $N_{HESIGB}$*4 μs, a DFT period of 3.2 μs, a GI of 0.8 μs, and a subcarrier spacing of 312.5 kHz. $N_{HESIGB}$ represents the number of OFDM symbols of the HE-SIG-B field and may have a variable value. In addition, although a DL Multi-User (MU) packet may include the HE-SIG-B field, a Single-User (SU) packet and a UL trigger based packet may not include the HE-SIG-B field.

HE-STF is an HE Short Training field and may have a duration of 4 or 8 μs. A non-trigger based PPDU may have a subcarrier spacing equivalent to 1250 kHz and a trigger based PPDU may have a subcarrier spacing equivalent to 625 kHz. HE-STF of the non-triggered PPDU may have a periodicity of 0.8 μs with 4 periods. The non-triggered PPDU is not transmitted in response to a trigger field. HE-STF of the trigger based PPDU may have a periodicity of 1.6 μs with 5 periods. The trigger based PPDU is a UL PPDU transmitted in response to the trigger frame.

HE-LTF is an HE Long Training field and may have a duration of $N_{HELTF}$*(DFT period+GI)μs. $N_{HELTF}$ represents the number of HE-LTF symbols and may have a value of 1, 2, 4, 6, or 8. An HE PPDU may support a 2xLTF mode and a 4xLTF mode. In the 2xLTF mode, an HE-LTF symbol except for a GI is equivalent to a symbol obtained by modulating every other tone in an OFDM symbol of 12.8 μs excluding a GI and then eliminating the first half or the second half of the OFDM symbol in the time domain. In the 4×LTF mode, an HE-LTF symbol excluding a GI are equivalent to a symbol obtained by modulating every fourth tone in an OFDM symbol of 12.8 μs excluding a GI and then eliminating the first three-fourths or the last three-fourths of the OFDM symbol in the time domain. 2×LTF may have a DFT period of 6.4 μs and 4×LTF may have a DFT period of 12.8 μs. A GI of HE-LTF may support 0.8 μs, 1.6 μs, and 3.2 μs. 2×LTF may have a subcarrier spacing equivalent to 156.25 kHz and 4×LTF may have a subcarrier spacing of 78.125 kHz.

HE-DATA is an HE DATA field and may have a duration of, $N_{DATA}*(DFT\ period+GI)$μs. $N_{DATA}$ represents the number of HE-DATA symbols. HE-DATA may have a DFT period of 12.8 μs. A GI of HE-DATA may support 0.8 μs, 1.6 μs, and 3.2 μs. HE-DATA may have a subcarrier spacing of 78.125 kHz.

The above description of the fields included in the HE PPDU frame format may be combined with example HE PPDU frame formats described below. For example, characteristics of fields exemplarily described below may be applied while a transmission order of the fields of the HE PPDU frame format of FIG. 7 is maintained.

Figure 8:
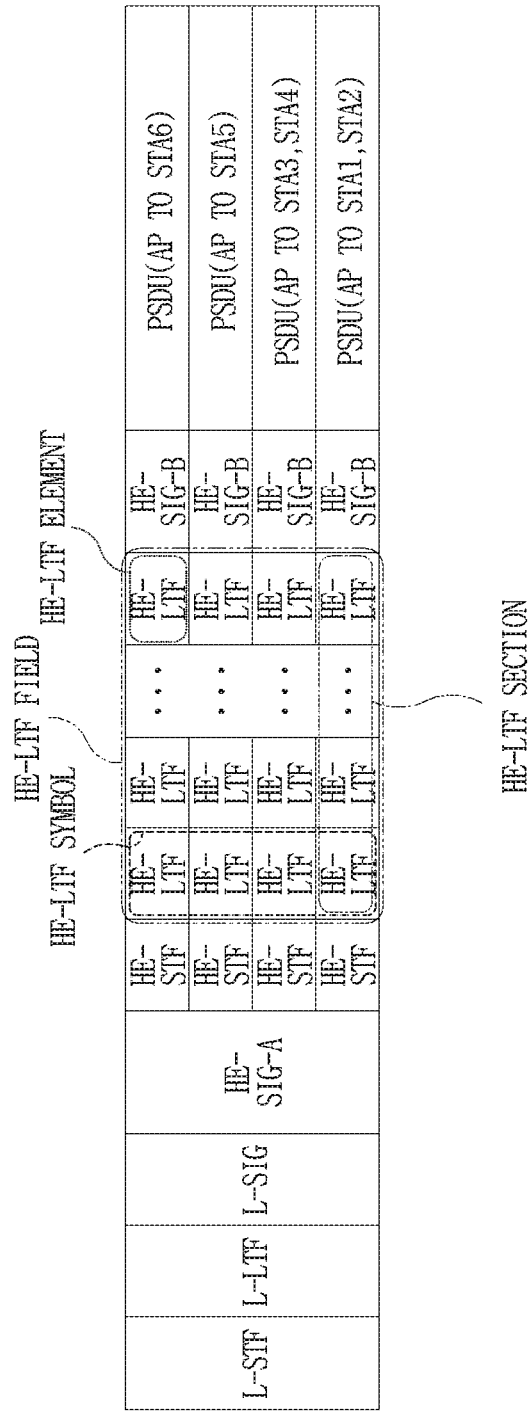
FIG. 8 depicts an example High Efficiency (HE) Physical layer Protocol Data Unit (PPDU) frame format according to the present disclosure.

FIG. 8 depicts an example HE PPDU frame format according to the present disclosure.

Referring to FIG. 8, the vertical axis represents frequency and the horizontal axis represents time. It is assumed that frequency and time increase in the upward direction and the right direction, respectively.

In the example of FIG. 8, one channel includes four subchannels. An L-STF, an L-LTF, an L-SIG, and an HE-SIG-A may be transmitted per channel (e.g., 20 MHz). An HE-STF and an HE-LTF may be transmitted on each basic subchannel unit (e.g., 5 MHz)), and an HE-SIG-B and a PSDU may be transmitted on each of the subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 8, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may also be referred to as Resource Unit (RU) or subband. In particular, terms like OFDMA subchannel, OFDMA RU, OFDMA subband can be used as synonyms for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely example. Thus, the basic subchannel unit may have a size of 2.5 MHz.

In FIG. 8, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements are logical units, and the PHY layer does not necessarily operate in units of an HE-LTF element. In the following description, an HE-LTF element may be referred to shortly as an HE-LTF.

An HE-LTF symbol may correspond to a set of HE-LTF elements in one OFDM symbol in time domain and in one channel unit (e.g., 20 MHz) in frequency domain.

An HE-LTF section may correspond to a set of HE-LTF elements in one or more OFDM symbols in time domain and in one subchannel unit (i.e., a subchannel bandwidth allocated to a STA) in frequency domain.

An HE-LTF field may be a set of HE-LTF elements, HE-LTF symbols, or HE-LTF sections for a plurality of STAs.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., a third-party STA is not allowed to transmit during a certain period based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at an HE STA (or HEW STA). The set of parameters included in the HEW SIG-A field may include one or more of Very High Throughput (VHT) PPDU modulation parameters transmitted by IEEE 802.11ac stations, as listed in Table II below, to ensure backward compatibility with legacy STAs (e.g., IEEE 802.11ac stations).

TABLE II

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU: Set to 1 if space time block coding is used and set to 0 otherwise. For a VHT MU PPDU: Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |

TABLE II-continued

| Two parts of VHT-SIG-A | Bit | Field | Number of bits | Description |
|---|---|---|---|---|
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows:<br>  Set to 0 for 0 space-time streams<br>  Set to 1 for 1 space-time stream<br>  Set to 2 for 2 space-time streams<br>  Set to 3 for 3 space-time streams<br>  Set to 4 for 4 space-time streams<br>  Values 5-7 are reserved<br>For a VHT SU PPDU:<br>B10-B12<br>  Set to 0 for 1 space-time stream<br>  Set to 1 for 2 space-time streams<br>  Set to 2 for 3 space-time streams<br>  Set to 3 for 4 space-time streams<br>  Set to 4 for 5 space-time streams<br>  Set to 5 for 6 space-time streams<br>  Set to 6 for 7 space-time streams<br>  Set to 7 for 8 space-time streams<br>B13-B21<br>  Partial AID: Set to the value of the TXVECTOR parameter PARTIAL_AID. Partial AID provides an abbreviated indication of the intended recipient(s) of the PSDU (see 9, 7a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise.<br>The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC<br>For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU:<br>  VHT-MCS index<br>For a VHT MU PPDU:<br>  If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1.<br>  If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1.<br>  If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1.<br>  B7 is reserved and set to 1 |
| | B8 | Beamformed | 1 | For a VHT SU PPDU:<br>  Set to 1 if a Beamforming steering matrix is applied to the waveform in an SU transmission as described in 20.3.11.11.2, set to 0 otherwise.<br>For a VHT MU PPDU:<br>  Reserved and set to 1<br>NOTE-If equal to 1 smoothing is not recommended. |

TABLE II-continued

| Two parts of VHT-SIG-A | Bit | Field | Number of bits | Description |
|---|---|---|---|---|
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23: | Tail | 6 | Used to terminate the trellis of the convolutional decoder. Set to 0. |

Table II illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11 ac-2013 technical specification, which is hereby incorporated by reference. In the HE PPDU frame format of the present disclosure, the HE-SIG-A field may include one or more of the fields included in the VHT-SIG-A field, and it may provide backward compatibility with IEEE 802.11ac stations.

Figure 9:
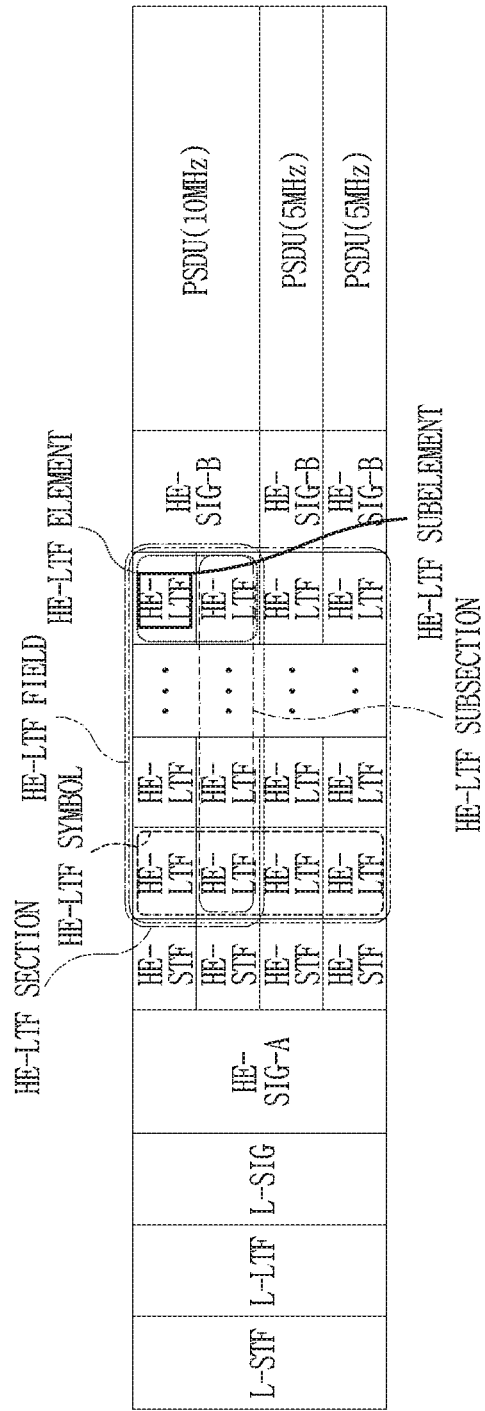
FIG. 9 depicts subchannel allocation in an HE PPDU frame format according to the present disclosure.

FIG. 9 depicts subchannel allocation in the HE PPDU frame format according to the present disclosure.

In FIG. 9, it is assumed that information indicating subchannels allocated to STAs in HE PPDU indicates that 0 MHz subchannel is allocated to STA1 (i.e., no subchannel is allocated), a 5-MHz subchannel is allocated to each of STA2 and STA3, and a 10-MHz subchannel is allocated to STA4.

In the example of FIG. 9, an L-STF, an L-LTF, an L-SIG, and an HE-SIG-A may be transmitted per channel (e.g., 20 MHz), an HE-STF and an HE-LTF may be transmitted on each basic subchannel unit (e.g., 5 MHz), and an HE-SIG-B and a PSDU may be transmitted on each of the subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 9, the size of a subchannel allocated to STA2 is equal to that of the basic subchannel unit, the size of a subchannel allocated to STA3 is equal to that of the basic subchannel unit, and the size of a subchannel allocated to STA4 is twice the size of the basic subchannel unit.

FIG. 9 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 9, one HE-LTF element includes one HE-LTF subelement in the 5-MHz subchannel allocated to STA2 or STA3. On the other hand, one HE-LTF element includes two HE-LTF subelements in the third subchannel (i.e., 10-MHz subchannel, allocated to STA4). An HE-LTF element and an HE-LTF subelement are logical units and the PHY layer does not always operate in units of an HE-LTF element or HE-LTF subelement.

An HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

An HE-LTF section may correspond to a set of HE-LTF elements in one or more OFDM symbols in the time domain and one subchannel unit (i.e. the bandwidth of a subchannel allocated to a STA) in the frequency domain. An HE-LTF subsection may correspond to a set of HE-LTF elements in one or more OFDM symbols in the time domain and one basic subchannel unit (e.g., 5 MHz) in the frequency domain. In the example of FIG. 9, one HE-LTF section includes one HE-LTF subsection in the 5-MHz subchannel allocated to STA2 or STA3. On the other hand, one HE-LTF section includes two HE-LTF subsections in the third subchannel (i.e., 10-MHz subchannel, allocated to STA4).

An HE-LTF field may correspond to a set of HE-LTF elements (or subelements), HE-LTF symbols, or HE-LTF sections (or subsections) for a plurality of STAs.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 8, if one channel includes four subchannels, it may not be allowed to keep the third subchannel unallocated and empty, while the first, second, and fourth subchannels are allocated to STAs. However, the present disclosure does not exclude non-allocation of an intermediate subchannel of one channel to a STA.

Figure 10:
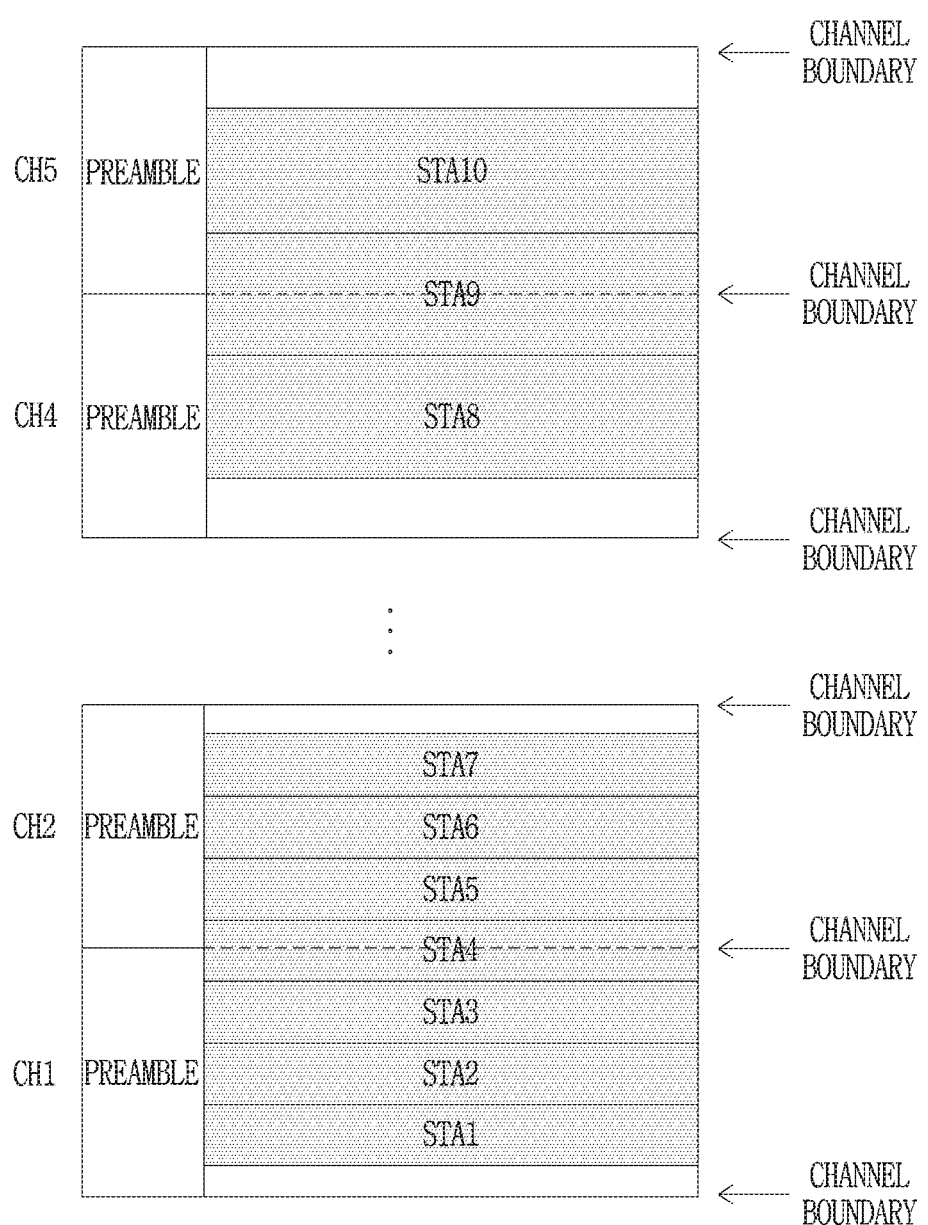
FIG. 10 depicts a subchannel allocation method according to the present disclosure.

FIG. 10 depicts a subchannel allocation method according to the present disclosure.

In the example of FIG. 10, a plurality of contiguous channels (e.g., 20-MHz-bandwidth channels) and boundaries of the plurality of contiguous channels are shown. In FIG. 10, a preamble may correspond to an L-STF, an L-LTF, an L-SIG, and an HE-SIG-A as illustrated in the examples of FIGS. 8 and 9.

A subchannel for each HE STA may be allocated within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 10 is based on the assumption that subchannels each having the size of a basic subchannel unit (e.g., 5 MHz) in CH1 and CH2 are allocated to STA1 to STA7, and subchannels, each having double the size (e.g., 10 MHz) of the basic subchannel unit in CH4 and CH5, are allocated to STA8, STA9, and STA10.

As illustrated in the lower part of FIG. 10, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to two channels). In the foregoing example of the present disclosure, the subchannel allocation to STA4 is not allowed.

As illustrated in the upper part of FIG. 10, although a subchannel allocated to STA8 or STA10 is fully overlapped only with one channel (i.e., without crossing the channel boundary, or belonging only to one channel), a subchannel allocated to STA9 is partially overlapped with two channels (i.e., crossing the channel boundary, or belonging to two channels). In the foregoing example of the present disclosure, the subchannel allocation to STA9 is not allowed.

On the other hand, in some embodiments, it may be allowed to allocate a subchannel partially overlapped between a plurality of channels (i.e., crossing the channel boundary, or belonging to two or more channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present disclosure and thus should not be construed as limiting the present disclosure. For example, the bandwidths of a channel and a subchannel may be defined or allocated as values other than the above examples. In addition, a plurality of subchannels in one channel may have the same or different channel widths.

Figure 11:
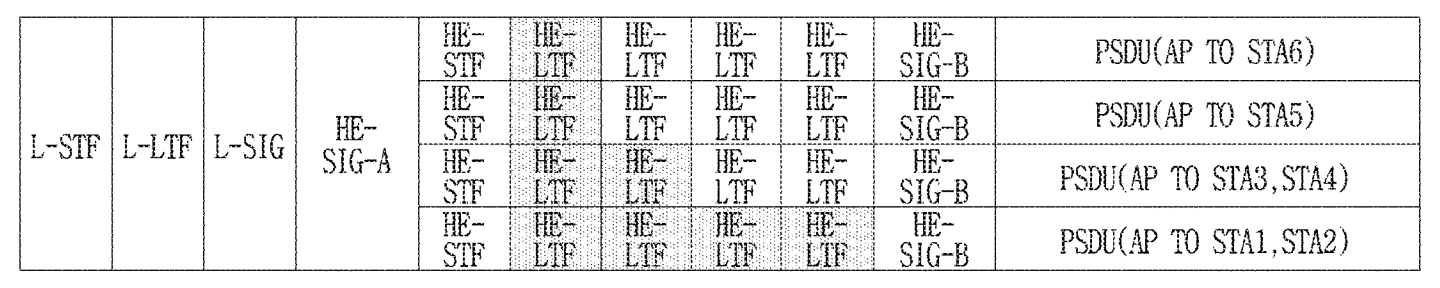

FIG. 11 depicts the starting and ending points of an HE-LTF field in the HE PPDU frame format according to the present disclosure.

To support the MU-MIMO mode and the OFDMA mode, the HE PPDU frame format according to the present disclosure may include, in the HE-SIG-A field, information about the number of spatial streams to be transmitted to an HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in additional detail.

FIG. 11 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, an HE-STF, an HE-LTF, an HE-LTF, an HE-LTF, an HE-LTF, and an HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in an HE-LTF section) as the number of the spatial streams, that is, four HE-LTFs are transmitted to support MU-MIMO transmission.

According to an example of the present disclosure, the relationship between a total number of spatial streams transmitted on one subchannel and a number of HE-LTFs is listed in Table III.

TABLE III

| Total number of spatial streams transmitted on one subchannel | Number of HE-LTFs |
|---|---|
| 1 | 1 |
| 2 | 2 |
| 3 | 4 |
| 4 | 4 |
| 5 | 6 |
| 6 | 6 |
| 7 | 8 |
| 8 | 8 |

Referring to Table III as an example, if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number that is 1 larger than the number of the spatial streams need to be transmitted.

Referring to FIG. 11 again, it is assumed that the second 5-MHz subchannel is allocated to STA3 and STA4 and one spatial stream per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 11, an HE-STF, an HE-LTF, an HE-LTF, an HE-LTF, an HE-LTF, and an HE-SIG-B follow the HE-SIG-A field on the subchannel (i.e., four HE-LTFs are transmitted). This is for the purpose of setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby disrupting orthogonality (i.e., orthogonality is not maintained). To overcome this problem, an additional constraint needs to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the number of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the number of HE-LTFs (HE-LTF symbols or HE-LTF elements in an HE-LTF section) required according to the total number of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that an HE-LTF field starts at the same time point and ends at the same time point in an HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 8) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to Table III). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting an HE PPDU frame in the MU-MIMO or OFDMA mode, a transmitter may generate P (where P is an integer equal to or larger than 1) HE-LTF symbols (refer to FIG. 8) and transmit an HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e., P) of another subchannel. Also, the number of HE-LTF elements (i.e., P) included in an HE-LTF section in one of the Q subchannels may be equal to the number of HE-LTF elements (i.e., P) included in an HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or STAs).

Referring to FIG. 11 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 11, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are not actually used for channel estimation at the STAs.

FIG. 12 depicts an HE-SIG-B field and an HE-SIG-C field in the HE PPDU frame format according to the present disclosure.

To effectively support MU-MIMO-mode or OFDMA-mode transmission in the HE PPDU frame format according to the present disclosure, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, an HE-SIG-A field. An HE-SIG-B field may include spatial stream allocation information about one subchannel. Also, an HE-SIG-C field may be transmitted after transmission of HE-LTFs, including Modulation and Coding Scheme (MCS) information about a PSDU and information about the length of the PSDU, etc.

Figure 13:
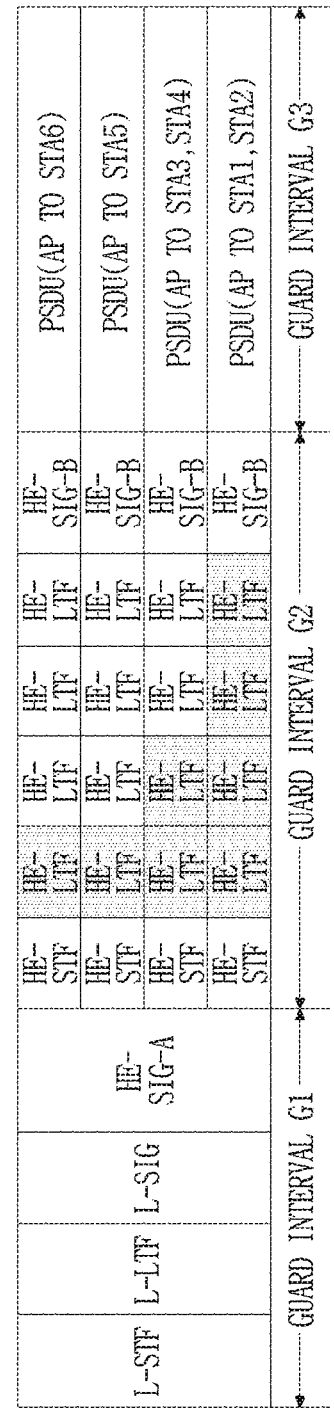
FIG. 13 depicts another example of an HE PPDU frame format according to the present disclosure.

FIG. 13 depicts OFDM symbol durations and GI lengths in the HE PPDU frame format according to the present disclosure.

In the HE PPDU frame format according to the present disclosure, L-STF, L-LTF, L-SIG, and HE-SIG-A fields may be configured with 4.0 μs OFDM symbols based on 64-FFT. One OFDM symbol has a GI of 0.8 μs. In the present disclosure, a GI value applied to the L-STF, L-LTF, L-SIG, and HE-SIG-A fields is defined as G1. The L-STF, L-LTF, L-SIG, and HE-SIG-A fields may include 3.2-μs OFDM symbols based on 64-FFT, excluding the GIs. The term 64 FFT-based symbol is used mainly based on a channel bandwidth of 20 MHz. If the term 64 FFT-based symbol is used irrespective of a channel bandwidth, a 64 FFT-based symbol may mean a symbol having a symbol duration of 3.2 μs and a subcarrier spacing of 312.5 kHz.

The following HE-STF, HE-LTF, HE-SIG-B, and PSDU fields may include 16-μs OFDM symbols based on 256-FFT. The OFDM symbol duration may be changed according to a GI value. Two types of GI values may be defined for one OFDM symbol during different time periods. A GI value applied to the OFDM symbols of the HE-STF, HE-LTF, and HE-SIG-B fields is defined as G2 and a GI value applied to the OFDM symbols of the PSDU is defined as G3. Excluding the GIs, the HE-STF, HE-LTF, HE-SIG-B, and PSDU fields may be configured with 12.8-μs OFDM symbols based on 256-FFT. The term 256 FFT-based symbol is used mainly based on a channel bandwidth of 20 MHz. If the term 256 FFT-based symbol is used irrespective of a channel bandwidth, a 256 FFT-based symbol may mean a symbol having a symbol duration of 12.8 μs and a subcarrier spacing of 78.125 kHz.

The values of G2 and G3 may be equal or different. If G2 and G3 are equal, G2 and G3 may be defined as one parameter without distinguishing between G2 and G3. In one embodiment, unlike GI, G2 and G3 may vary according to a transmitted PPDU transmission vector, rather than being fixed values (i.e., predetermined values). This is because the lengths of the HE-STF, HE-LTF, and HE-SIG-B fields to which G2 is applied may vary according to a PPDU transmission vector and the length of the PSDU to which G3 is applied may also vary according to the PPDU transmission vector.

For example, G1 may have a fixed value (i.e., a predetermined value) of 0.8 μs, G2 may be a value selected from 3.2 μs, 1.6 μs, 0.8 μs, and 0.4 μs, and G3 may be a value selected from among 3.2 μs, 1.6 μs, 0.8 μs, and 0.4 μs. Also, G1 may have a fixed value (i.e., a predetermined value) of 0.8 μs, and G2 or G3 may be a value selected or determined from among 3.2 μs, 1.6 μs, 0.8 μs, and 0.4 μs. In one embodiment, G1 does not require separate signaling because G1 is a fixed value, and signaling information indicating G2 and G3 may be provided to an HE STA in the HE-SIG-A field.

In one embodiment, G2 and G3 are applied commonly across all OFDM symbols transmitted during a corresponding time period and across all subchannels. Accordingly, PSDU transmission timings and OFDM symbol timings may be synchronized. For example, it may not be allowed to apply a 3.2-μs G2 value to a subchannel and a 1.6-μs or 0.8-μs G2 value to another subchannel during a specific time period. Rather, the same 3.2-μs G2 value may be applied to the subchannels during the same time period. In a similar example, it may not be allowed to apply a 1.6-μs G3 value to a subchannel and a 3.2-μs or 0.8-μs G3 value to another subchannel during a specific time period. Rather, the same 1.6-μs G3 value may be applied to the subchannels during the same time period.

In the case where an HE PPDU frame format having HE-LTF sections of different lengths for subchannels is used (i.e., in the case where the number of HE-LTFs is not determined for each subchannel based on the maximum of the number of HE-LTFs required according to the total number of spatial streams transmitted on each subchannel in a set of HE STAs allocated to each of subchannels, as described in the example of FIG. 11), if the values of G2 and G3 are different, PSDUs are transmitted on different subchannels at different time points and OFDM symbol timings are not synchronized. Therefore, values of G2 and G3 may need to be selected or determined as a same value.

In the case where an HE PPDU frame format having HE-LTF sections of the same length for subchannels is used (i.e., in the case where the number of HE-LTFs is determined for each subchannel based on the maximum of the numbers of HE-LTFs required according to the total number of spatial streams transmitted on each subchannel in a set of HE STAs allocated to each of subchannels, as described in the example of FIG. 11), even though the values of G2 and G3 are different, PSDUs are transmitted on the subchannels at the same time point, without causing discrepancy between OFDM symbol timings. Therefore, values of G2 and G3 may be selected or determined as different values. However, even in this case, the present disclosure does not exclude that values of G2 and G3 may be selected or determined as a same value.

In the example of FIG. 13, OFDM symbol durations S1, S2, and S3 may be applied respectively to time periods to which the GIs G1, G2, and G3 are applied.

Figure 14:
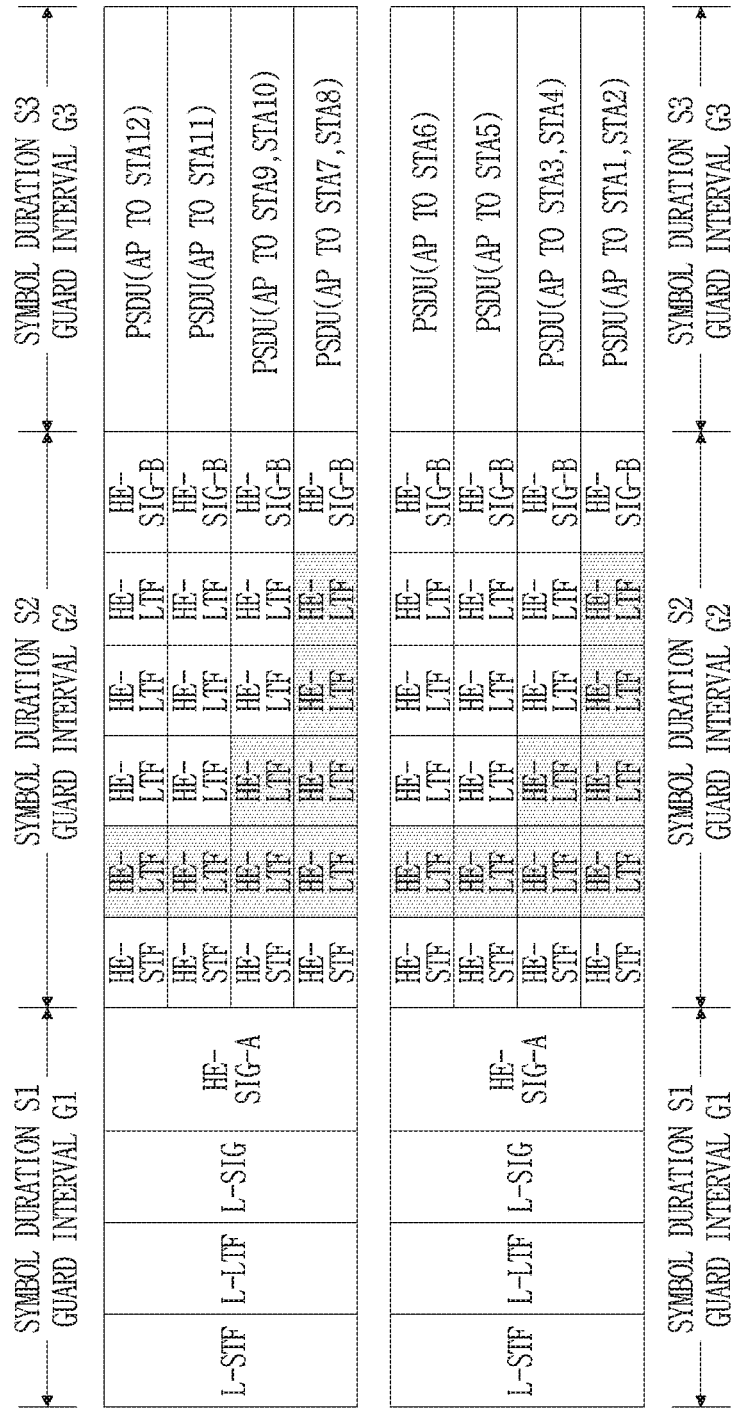
FIG. 14 depicts an example HE PPDU frame format for a wide channel band according to the present disclosure.

FIG. 14 depicts an example HE PPDU frame format for a wide channel band according to the present disclosure.

Referring to FIG. 14, the HE PPDU frame format for one 20-MHz channel illustrated in the example of FIG. 13 is extended to two 20-MHz channels. Similarly, HE PPDU frame formats for the channel bandwidths of 80 MHz and 160 MHz may be configured by extending the HE PPDU frame format for one 20-MHz channel illustrated in the example of FIG. 13 to four and eight 20-MHz channels, respectively.

There is no modification involved in extending the HE PPDU frame format for one 20-MHz channel. In other words, all subchannels across one or more 20-MHz channels are the same in terms of PSDU transmission time points, OFDM symbol durations, and GIs.

From this viewpoint, the example described with reference to FIG. 11 in which "the lengths of HE-LTF sections across subchannels are equal" may be extended to simultaneous application on a channel basis as well as on a subchannel basis. Therefore, PSDU transmission timings and OFDM symbol timings are synchronized for users paired for MU-MIMO-mode or OFDMA-mode transmission, thus maintaining orthogonality. This channel-based example will be described below.

Basically in SU-MIMO-mode or non-OFDMA-mode transmission, it is sufficient to transmit as many HE-LTFs as required. However, the timings of fields transmitted on subchannels for other paired STAs need to be synchronized (or aligned) across all subchannels over one or more 20-MHz channels in MU-MIMO-mode or OFDMA-mode transmission. Therefore, the numbers of HE-LTFs on all other subchannels over one or more 20-MHz channels may be determined based on a subchannel having a maximum number of streams among all subchannels over one or more 20-MHz channels in MU-MIMO-mode or OFDMA-mode transmission.

Specifically, the number of HE-LTFs to be transmitted on all subchannels may be determined according to the maximum of the number of HE-LTFs required according to the total numbers of spatial streams transmitted on each subchannel over one or more 20-MHz channels, for a set of HE STAs allocated to each of the subchannels. Herein, 'the set of HE STAs allocated to each of the subchannels over one or more 20-MHz channels' is one HE STA in the SU-MIMO mode, whereas it is a set of a plurality of HE STAs paired on all subchannels over one or more 20-MHz channels in the MU-MIMO mode or OFDMA mode. The 'total number of spatial streams transmitted on each of all subchannels over one or more 20-MHz channels' is the number of spatial streams transmitted to one HE STA in the SU-MIMO mode and the number of spatial streams transmitted to a plurality of HE STAs paired on the subchannel in the MU-MIMO mode or OFDMA mode.

That is, it may be said that an HE-LTF field starts at the same time point and ends at the same time point on all subchannels over one or more 20-MHz channels for all users (i.e., HE STAs) in MU-MIMO-mode or OFDMA-mode transmission of an HE PPDU. Or it may be said that the lengths of HE-LTF sections are equal on all subchannels over one or more 20-MHz channels for all HE STAs in MU-MIMO-mode or OFDMA-mode transmission. Or it may be said that the number of HE-LTF elements included in each HE-LTF section is equal in all subchannels over one or more 20-MHz channels for all HE STAs in MU-MIMO-mode or OFDMA-mode transmission. Accordingly, PSDU transmission timings may be synchronized between all subchannels over one or more 20-MHz channels for all HE STAs in MU-MIMO-mode or OFDMA-mode transmission.

In FIG. 14, the OFDM symbol duration and GI of L-STF, L-LTF, L-SIG, and HE-SIG-A fields on the first 20-MHz channel are S1 and G1, respectively. Like the first 20-MHz channel, the second 20-MHz channel has S1 and G1 respectively as the OFDM symbol duration and GI of L-STF, L-LTF, L-SIG, and HE-SIG-A fields.

In FIG. 14, the OFDM symbol duration and GI of an HE-STF field, a plurality of HE-LTFs, and an HE-SIG-B field on the first 20-MHz channel are S2 and G2, respectively. Like the first 20-MHz channel, the OFDM symbol duration and GI of an HE-STF field, a plurality of HE-LTFs, and an HE-SIG-B field on the second 20-MHz channel are also S2 and G2, respectively.

In FIG. 14, the OFDM symbol duration and GI of a PSDU on the first 20-MHz channel are S3 and G3, respectively. Like the first 20-MHz channel, the OFDM symbol duration and GI of a PSDU on the second 20-MHz channel are also S3 and G3, respectively.

This example it is shown that if the OFDM symbol duration and GI of one 20-MHz channel are determined based on 64-FFT, the OFDM symbol duration and GI of the other 20-MHz channel(s) should be determined based on 64-FFT. In other words, if the OFDM symbol duration and GI of one 20-MHz channel are determined based on 64-FFT, the OFDM symbol duration and GI of the other 20-MHz channel(s) should not be determined based on 256-FFT.

In a modified example, although subchannels within one 20-MHz channel may have the same OFDM symbol durations and the same GIs, subchannels within another 20-MHz channel may have different OFDM symbol durations and GIs. For example, while S2, G2, S3, and G3 are applied as OFDM symbol durations and GIs for subchannels within the first 20-MHz channel, different values (e.g., S4, G4, S5, and G5) may be applied as OFDM symbol durations and GIs for subchannels within the second 20-MHz channel. Even in this case, the OFDM symbol duration and GI, S1 and G1, applied to L-STF, L-LTF, and L-SIG fields in a different 20-MHz channel may be the same fixed values in every 20-MHz channel.

Further, this modified example may include application of the example described before with reference to FIG. 11 in which 'subchannels have the same HE-LTF section length' only to subchannels within one 20-MHz channel, not to the HE-LTF section length of subchannels in another 20-MHz channel.

With reference to the foregoing examples of the present disclosure, mainly the features of an HE PPDU frame structure applicable to a DL MU-MIMO-mode or OFDMA-mode transmission that an AP transmits simultaneously to a plurality of STAs has been described. Now, a description will be given of the features of an HE PPDU frame structure applicable to a UL MU-MIMO-mode or OFDMA-mode transmission that a plurality of STAs transmit simultaneously to an AP.

The above-described various examples of structures of the HE PPDU frame format supporting MU-MIMO-mode or OFDMA-mode transmission should not be understood as applicable only to DL without being applicable to UL. Rather, the examples should be understood as also applicable to UL. For example, the above-described example HE PPDU frame formats may also be used for a UL HE PPDU transmission that a plurality of STAs simultaneously transmit to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to an HE STA allocated to each of a plurality of subchannels. Therefore, the AP may include, in an HE-SIG-A field or an HE-SIG-B field, information about the total number of spatial streams transmitted across a channel, a maximum number of spatial streams (i.e., information being a basis of the number of HE-LTF elements (or the starting point and ending point of an HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmit to an AP, each STA being a transmission entity may only be aware of the number of spatial streams in an HE PSDU that it will transmit, without knowledge of the number of spatial streams in an HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, an HE PPDU frame format applicable to a UL MU-MIMO or OFDMA mode may be configured without modification to an example HE PPDU frame format applied to a DL MU-MIMO or OFDMA mode. For example, each STA may configure an HE PPDU frame format by including information about the number of spatial streams across a channel in an HE-SIG-A field, determining the number of HE-LTF elements (or the starting point and ending point of an HE-LTE section) on each subchannel according to the maximum number of spatial streams, and including information about the number of spatial streams for the individual STA in an HE-SIG-B field.

Alternatively, if the STAs operate according to the common/individual parameters received in the trigger frame from the AP, each STA does not need to indicate the common/individual parameters to the AP during an HE PPDU transmission. Therefore, this information may not be included in an HE PPDU. For example, each STA may determine the total number of spatial streams, the maximum number of spatial streams, and the number of spatial streams allocated to individual STA, as indicated by the AP, and configure an HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Bandwidth (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before an HE-LTF field because the number of spatial streams and the information indicating whether STBC is used or not are significant to determination of configuration information about a preamble and a PSDU in an HE PPDU frame format (e.g., the number of HE-LTF elements is determined according to a combination of the number of spatial streams and the information indicating whether STBC is used or not). For this purpose, an HE PPDU frame format as illustrated in FIG. 15 may be used for a UL HE PPDU transmission.

Figure 15:
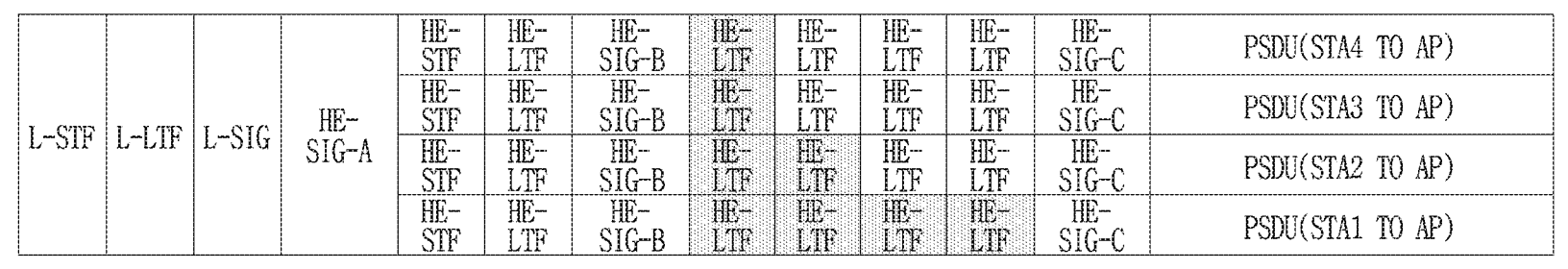

FIG. 15 depicts another example HE PPDU frame format according to the present disclosure. The HE PPDU frame format illustrated in FIG. 15 is characterized in that a structure of HE-SIG-A, HE-SIG-B, and HE-SIG-C fields similar to that in FIG. 12 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of an HE-SIG-B field, an HE-SIG-C field, and a first HE-LTF element (i.e., an HE-LTF between an HE-STF field and an HE-SIG-B field) illustrated in FIG. 15 may not be present. In this case, a description of each field given below may be applicable only in the presence of the field.

In the example of FIG. 15, an HE-SIG-A field is transmitted per channel (i.e., per 20-MHz channel) and may include transmission parameters common to simultaneously transmitted HE PSDUs. Since the same information is transmitted in the fields from the L-STF to HE-SIG-A in UL PPDUs transmitted by HE STAs allocated to subchannels, the AP may receive the same signals from the plurality of STAs successfully.

An HE-SIG-B field is transmitted per subchannel in one channel. The HE-SIG-B field may have an independent parameter value according to the transmission characteristics of an HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

An HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similar to DL MU-MIMO-mode or OFDMA-mode HE PPDU transmission, if transmission of PSDUs start at different time points on subchannels in UL MU-MIMO-mode or OFDMA-mode HE PPDU transmission, and if OFDM symbols are not aligned accordingly, then the implementation complexity of an AP that receives a plurality of PSDUs is increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 11.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

In the HE PPDU frame format supporting UL MIMO-mode or OFDMA-mode transmission illustrated in FIG. 15, the L-STF, L-LTF, L-SIG, and HE-SIG-A fields may include 4.0-µs OFDM symbols based on 64-FFT. One OFDM symbol has a GI of 0.8 µs. In the present description, a GI value applied to the L-STF, L-LTF, L-SIG, and HE-SIG-A fields is defined as G1. Excluding the GI, the L-STF, L-LTF, L-SIG, and HE-SIG-A fields may be configured as 3.2-µs OFDM symbols based on 64-FFT.

In the example of FIG. 15, an HE-STF field, an HE-LTF field, an HE-SIG-B field, HE-LTF elements(s) in an HE-LTF section, an HE-SIG-C field and a PSDU may include 16-µs OFDM symbols based on 256-FFT. The OFDM symbol duration may be changed according to a GI value. Two types of GI values may be defined for one OFDM symbol for different time periods. A GI value applied to the OFDM symbols of the HE-STF field, the HE-LTF field, the HE-SIG-B field, the HE-LTF elements(s) in the HE-LTF section, and the HE-SIG-C field is defined as G2 and a GI value applied to the OFDM symbols of the PSDU is defined as G3. Excluding the GIs, the HE-STF field, the HE-LTF field, the HE-SIG-B field, and the PSDU may include 12.8-µs OFDM symbols based on 256-FFT.

The values of G2 and G3 may be equal or different. If G2 and G3 are equal, G2 and G3 may be defined as one parameter without distinguishing G2 from G3. In one embodiment, unlike G1, G2 and G3 may vary according to each transmitted PPDU transmission vector, rather than being fixed values (i.e. predetermined values known to both a transmitter and a receiver). This is because the lengths of the HE-STF, the HE-LTF, the HE-SIG-B, the HE-LTF element(s) in an HE-LTF section, and the HE-SIG-C to which G2 is applied may vary according to a PPDU transmission vector and the length of the PSDU to which G3 is applied may also vary according to the PPDU transmission vector.

In another example, the G1 applied to the L-STF, L-LTF, L-SIG, and HE-SIG-A fields (to which 64-FFT is applied) may be a fixed value (i.e., a predefined value known to both a transmitter and a receiver) and one of G2 and G3 (if G2 and G3 are equal, they may be defined as one parameter) applied to the following fields (i.e., the HE-STF, HE-LTF, HE-SIG-B, HE-SIG-C, and PSDU to which 256-FFT is applied) may be configured or indicated as a variable value (e.g., one of 3.2 µs, 1.6 µs, 0.8 µs, and 0.4 µs).

More specifically, G1 may have a fixed value (i.e. a predefined value known to both a transmitter and a receiver) of 0.8 µs, G2 may be a value selected or indicated from among 3.2 µs, 1.6 µs, 0.8 µs, and 0.4 µs, and G3 may be a value selected or indicated from among 3.2 µs, 1.6 µs, 0.8 µs, and 0.4 µs. Also, G1 may be a fixed value (i.e. a predefined value known to both a transmitter and a receiver) of 0.8 µs, and G2 or G3 may be a value selected or indicated from among 3.2 µs, 1.6 µs, 0.8 µs, and 0.4 µs. G1 does not require signaling because G1 is a fixed value, and signaling information indicating G2 and G3 may be provided to the AP. If an HE STA performs UL transmission according to triggering of the AP (or based on parameters provided by the AP), the HE-STA does not need to indicate the value of G2 or G3 to the AP.

G2 and G3 are applied commonly across all OFDM symbols transmitted during a corresponding time period and across all subchannels. Accordingly, PSDU transmission timings may be synchronized, and OFDM symbol timings may be synchronized. For example, it is not allowed that a 3.2-µs G2 value is applied to a subchannel during a specific time period, while a 1.6-µs or 0.8-µs G2 value is applied to other subchannels during the same time period. Rather, the same 3.2-µs G2 value may be applied to other subchannels during the same time period. In a similar example, it is not allowed that a 1.6-µs G3 value is applied to a subchannel during a specific time period, while a 3.2-µs or 0.8-µs G3 value is applied to other subchannels during the same time period. Rather, the same 1.6-µs G3 value may be applied to other subchannels during the same time period.

In the case where an HE PPDU frame format having HE-LTF sections of different lengths for subchannels is used (i.e., in the case where 'the number of HE-LTFs is not determined for each subchannel based on the maximum of the numbers of HE-LTFs required according to the total numbers of spatial streams transmitted on subchannels in a set of HE STAs allocated to each of the subchannels'), if the values of G2 and G3 are different, a PSDU is transmitted on each subchannel at a different time point and OFDM symbol timings are not synchronized. Therefore, the same values for G2 and G3 may need to be selected or indicated in this case.

In the case where an HE PPDU frame format having HE-LTF sections of the same length for subchannels is used (i.e., in the case where 'the number of HE-LTFs is determined for each subchannel based on the maximum of the numbers of HE-LTFs required according to the total numbers of spatial streams transmitted on subchannels in a set of HE STAs allocated to each of the subchannels'), even though the values of G2 and G3 are different, PSDUs are transmitted on the subchannels at the same time point, without causing discrepancy between OFDM symbol timings. Therefore, selection or indication of different values for G2 and G3 does not cause a problem. However, even in this case, selection or indication of the same values for G2 and G3 is not excluded.

In the example of FIG. 15, OFDM symbol durations S1, S2, and S3 may be applied respectively to time periods to which the GIs G1, G2, and G3 are applied.

As described before, a plurality of STAs may simultaneously transmit PSDUs in an HE PPDU frame format on their allocated subchannels or on their allocated spatial streams to an AP (i.e., referred to as UL MU-MIMO or OFDMA transmission or "UL MU transmission") and may simultaneously receive PSDUs in the HE PPDU frame format on their allocated subchannels on their allocated spatial streams from the AP (i.e., referred to as DL MU-MIMO or OFDMA transmission or "DL MU transmission").

Figure 16:
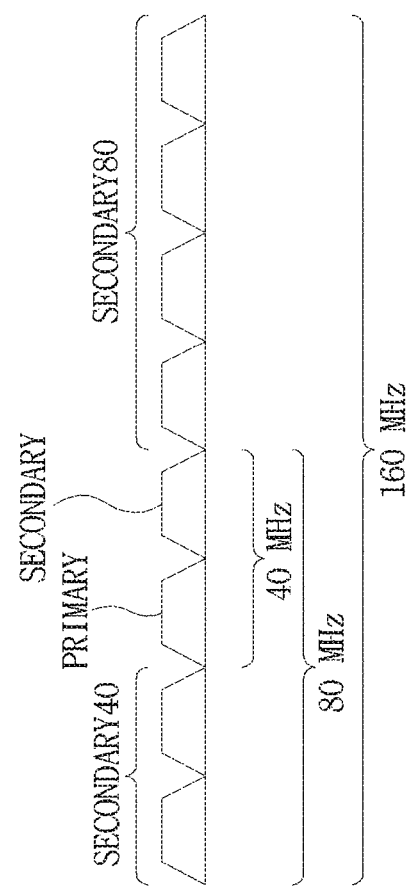
FIGS. 16 and 17 depict operating channels in a WLAN system.
Figure 17:
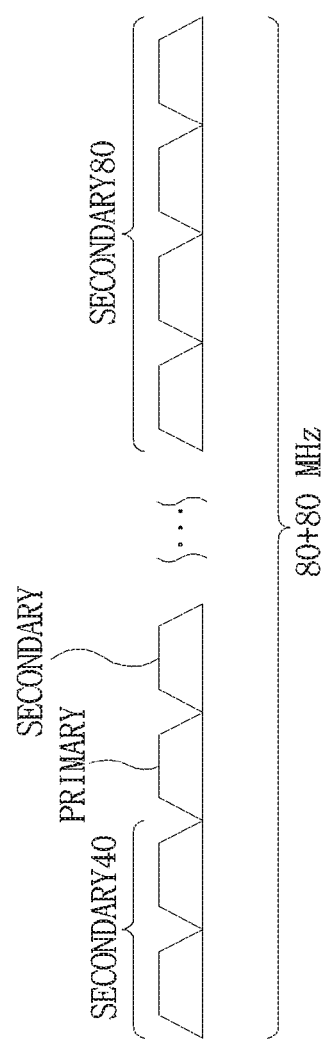

FIGS. 16 and 17 depict operating channels in a WLAN system.

Basically, the WLAN system may support a single channel having a bandwidth of 20 MHz as a BSS operating channel. The WLAN system may also support a BSS operating channel having a bandwidth of 40 MHz, 80 MHz, or 160 MHz by bonding a plurality of contiguous 20-MHz channels (refer to FIG. 16). Further, the WLAN system may support a BSS operating channel having a bandwidth of 160 MHz including non-contiguous 80-MHz channels (called a bandwidth of 80+80 MHz) (refer to FIG. 17).

As illustrated in FIG. 16, one 40-MHz channel may include a primary 20-MHz channel and a secondary 20-MHz channel which are contiguous. One 80-MHz channel may include a primary 40-MHz channel and a secondary 40-MHz channel which are contiguous. One 160-MHz channel may include a primary 80-MHz channel and a secondary 80-MHz channel which are contiguous. As illustrated in FIG. 17, one 80+80-MHz channel may include a primary 80-MHz channel and a secondary 80-MHz channel which are non-contiguous.

A primary channel is defined as a common channel for all STAs within a BSS. The primary channel may be used for transmission of a basic signal such as a beacon. The primary channel may also be a basic channel used for transmission of a data unit (e.g., a PPDU). If a STA uses a channel width larger than the channel width of the primary channel, for data transmission, the STA may use another channel within a corresponding channel, in addition to the primary channel. This additional channel is referred to as a secondary channel.

A STA according to an Enhanced Distributed Channel Access (EDCA) scheme may determine a transmission bandwidth (or a transmission channel width) as follows.

Upon generation of a transmission frame, a STA (e.g., an AP or a non-AP STA) may perform a back-off procedure on a primary channel in order to acquire a Transmission Opportunity (TXOP). For this purpose, the STA may sense the primary channel during a DIFS or AIFS[i]. If the primary channel is idle, the STA may attempt to transmit the frame. The STA may select a random back-off count, wait for a slot time corresponding to the selected random back-off count, and then attempt to transmit the frame. The random back-off count may be determined to be a value ranging from 0 to CW (CW is a value of a contention window parameter).

When the random back-off procedure starts, the STA may activate a back-off timer according to the determined back-off count and decrement the back-off count by 1 each time. If the medium of the corresponding channel is monitored as busy, the STA discontinues the count-down and waits. If the medium is idle, the STA resumes the count-down. If the back-off timer reaches 0, the STA may determine a transmission bandwidth by checking whether the secondary channel is idle or busy at the corresponding time point.

For example, the STA may monitor a channel-idle state during a predetermined IFS (e.g., DIFS or AIFS[i]) on the primary channel and determine a transmission start timing on the primary channel by the random back-off procedure. If the secondary channel is idle during a PIFS shortly before the determined transmission start timing of the primary channel, the STA may transmit a frame on the primary channel and the secondary channel.

As described above, when the back-off timer reaches 0 for the primary channel, the STA may transmit an X-MHz mask PPDU (e.g., where X is 20, 40, 80, or 160) on channels including an idle secondary channel(s) according to the CCA result of the secondary channel(s).

The X-MHz mask PPDU is a PPDU for which a TXVECTOR parameter, CH_BANDWIDTH, is set to CBW X. That is, if the X-MHz mask PPDU can be transmitted, this means that a PPDU satisfying a spectrum mask for X-MHz transmission can be transmitted. The X-MHz mask PPDU may include a PPDU transmitted in a bandwidth equal to or smaller than X MHz.

For example, if an 80-MHz mask PPDU can be transmitted, this means that a PPDU having a channel width of 80 MHz or a PPDU having a channel width smaller than 80 MHz (e.g., 40 MHz, 20 MHz, etc.) can be transmitted within a Power Spectral Density (PSD) limit of a spectrum mask for 80-MHz transmission.

As described before, if a STA is allowed to start a TXOP and has at least one MAC Service Data Unit (MSDU) to be transmitted under the Access Category (AC) of the TXOP allowed for the STA, the STA may perform one of the following a), b), c), d), or e) (in the following description, FIGS. 16 and 17 may be referred to for a primary channel (i.e., a primary 20-MHz channel) a secondary channel (i.e., a secondary 20-MHz channel), a secondary 40-MHz channel, and a secondary 80-MHz channel).

a) If the secondary channel, the secondary 40-MHz channel, and the secondary 80-MHz channel are idle during a PIFS shortly before the start of the TXOP, a 160-MHz or 80+80-MHz mask PPDU may be transmitted.

b) If both the secondary channel and the secondary 40-MHz channel are idle during the PIFS shortly before the start of the TXOP, an 80-MHz mask PPDU may be transmitted on a primary 80-MHz channel.

c) If the secondary channel is idle during the PIFS shortly before the start of the TXOP, a 40-MHz mask PPDU may be transmitted on a primary 40-MHz channel.

d) A 20-MHz mask PPDU may be transmitted on the primary 20-MHz channel.

e) A channel access attempt may be resumed by performing a back-off procedure as in the case where the medium is indicated as busy on the primary channel by one of physical carrier sensing and virtual carrier sensing and a back-off timer has a value of 0.

Figure 18:
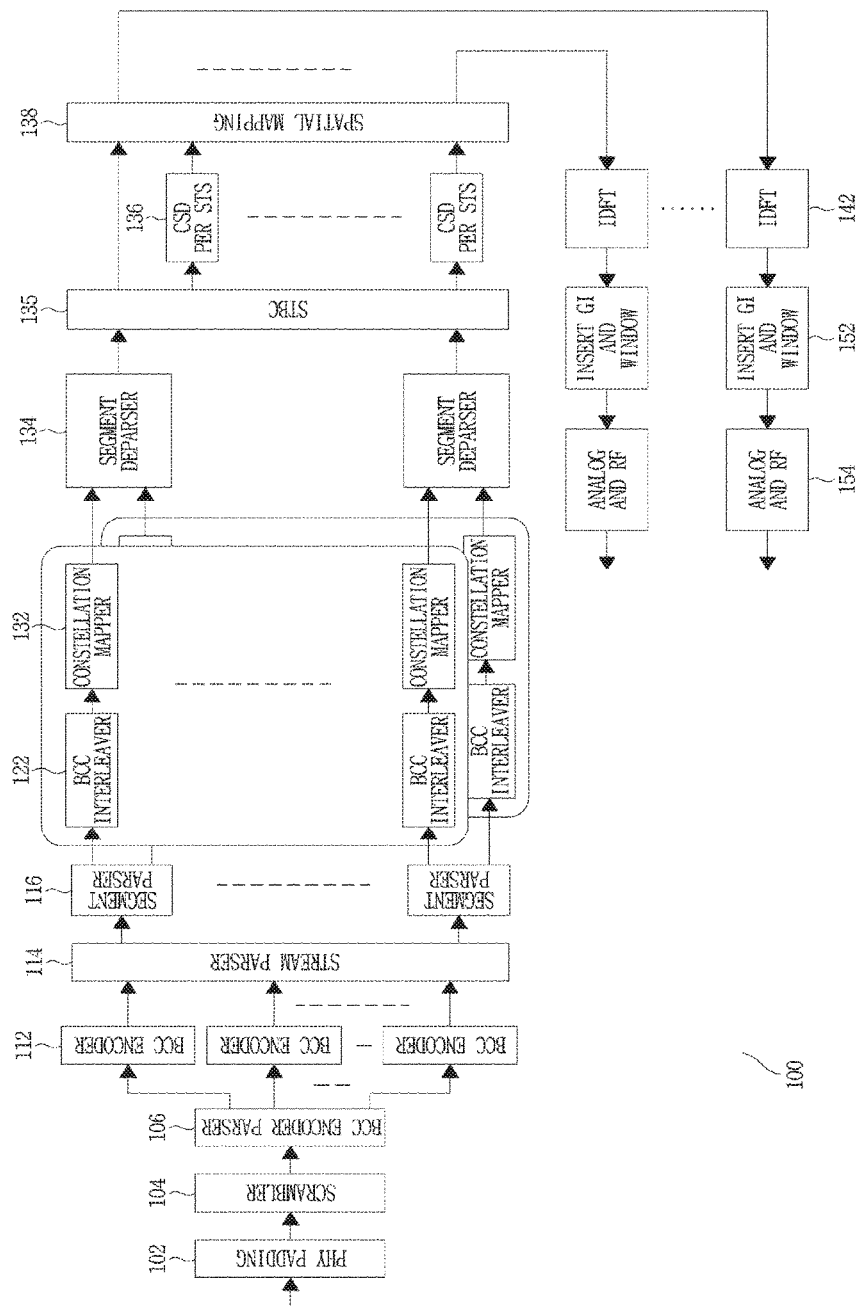
FIGS. 18 and 19 are block diagrams of a transmitting signal processing unit for wideband PPDU transmission.
Figure 19:
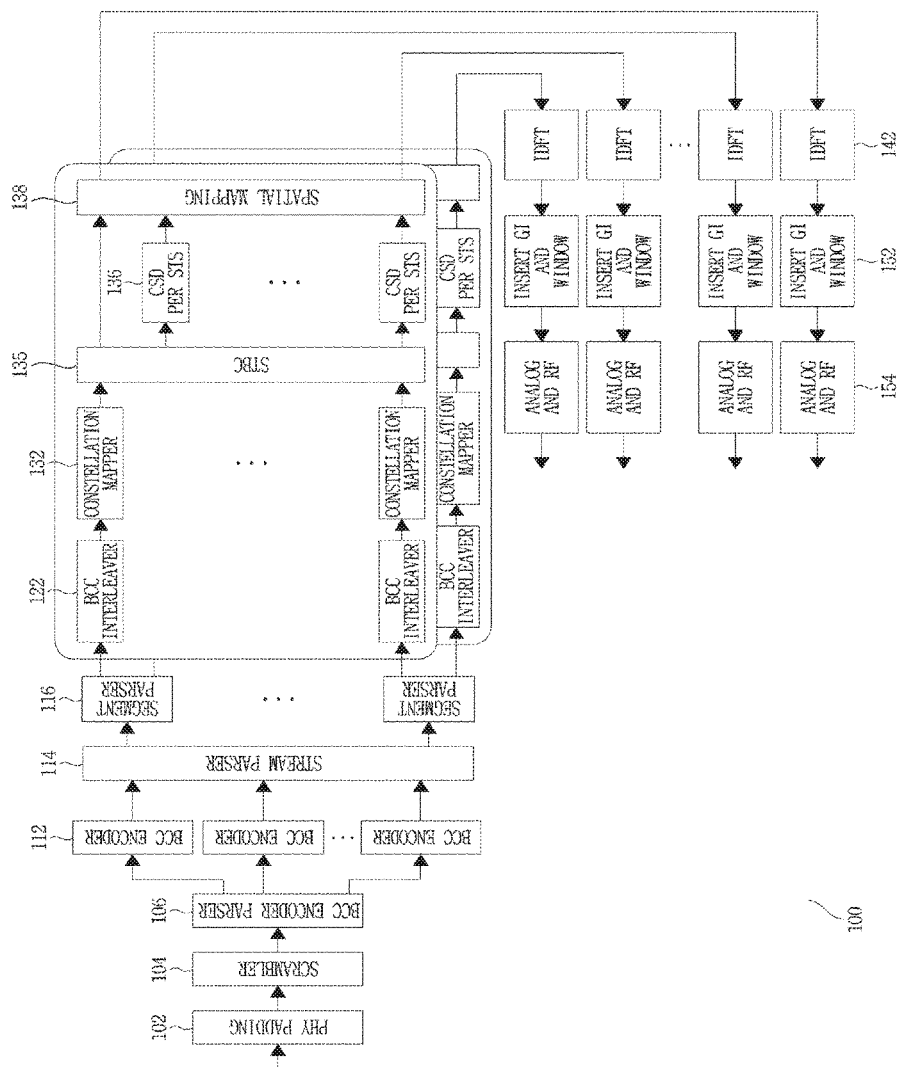

FIGS. 18 and 19 are block diagrams of a transmitting signal processing unit for wideband PPDU transmission.

Wideband PPDU transmission refers to transmission of a PPDU having the size of a frequency unit for transmission signal processing exceeding a predetermined threshold. For example, if the size of the frequency unit for transmission signal processing exceeds 80 MHz, transmission of the PPDU may be wideband PPDU transmission. More specifically, wideband PPDU transmission may include contiguous 160-MHz PPDU or 80+80-MHz PPDU transmission.

FIG. 18 is a block diagram of the transmitting signal processing unit for a Data field of a 160-MHz HE Single User (SU) PPDU to which BCC encoding is applied, and FIG. 19 is a block diagram of the transmitting signal processing unit for a Data field of a 80+80-MHz HE SU PPDU to which BCC encoding is applied.

The block diagrams of the transmitting signal processing unit 100 illustrated in FIGS. 18 and 19 may be specific examples of the block diagram of the transmitting signal processing unit 100 illustrated in FIG. 2. For example, the description of the encoder 110, the interleaver 120, the mapper 130, the IFT 140, the GI inserter 150, and the RF transmitter 21 is applicable to BCC encoders 112, BCC interleavers 122, constellation mappers 132, Inverse Discrete Fourier Transformer (IDFTs) 142, GI insertion and windowing units 152, and analog and RF units 154 illustrated in FIGS. 18 and 19. As described before with reference to FIG. 2, the transmitting signal processing unit 100 may further include a scrambler 104, an encoder parser (e.g., a BCC encoder parser 106), a stream parser 114, an STBC encoder 135, CSD per Space Time Stream (STS) inserters 136, and a spatial mapper 138. The same description as given of FIG. 2 is not provided for the example block diagrams of the transmitting signal processing unit 100 illustrated in FIGS. 18 and 19.

Additionally, the transmitting signal processing unit 100 may further include a PHY padder 102 and segment parsers 116 in the examples of FIGS. 18 and 19. In the case of contiguous 160-MHz transmission as illustrated in the example of FIG. 18, the transmitting signal processing unit 100 may further include segment deparsers 134.

Now, a description will be given of operations of the transmitting signal processing unit 100 with reference to FIGS. 18 and 19.

The PHY padder 102 may add a PAD (i.e., PHY padding bits) and a TAIL (i.e., PPDU TAIL bits) to a Data field or a PSDU of a HE-DATA field, as described before with reference to FIGS. 6 and 7.

The scrambler 104 may scramble data to which the PHY padding is applied.

The BCC encoder parser 106 may divide the scrambled bits among the BCC encoders 112 by providing the scrambled bits to the different BCC encoders 112 in a round robin manner. The number of BCC encoders 112 may be determined according to rate-dependent parameters (e.g., the number $N_{SYM}$ of symbols in the Data field, the number $N_{DBPS}$ of data bits per symbol, etc.).

The stream parser 114 may rearrange the outputs of the BCC encoders 112 in blocks. Specifically, the stream parser 114 may divide input bits (i.e., encoded bits) to be transmitted to each user into spatial streams.

For contiguous 160-MHz or non-contiguous 80+80-MHz transmission, the segment parsers 116 may divide output bits of the stream parser 114 into two frequency subblocks.

The BCC interleavers 122 may interleave bit streams output from the segment parsers 116.

The constellation mappers 132 may map bit streams output from the BCC interleavers 122 to Binary Phase Shift Keying (BPSK), Quadrature PSK (QPSK), 16-ary Quadrature Amplitude Modulation (16-QAM), 64-QAM, or 256-QAM constellation points.

The segment deparsers 134 may merge the two frequency subblocks into one frequency segment, for contiguous 160-MHz transmission (e.g., in the example of FIG. 18). The merged frequency segment may be processed by the STBC encoder 135, the CSD per STS inserters 136, the spatial mapper 138, the IDFTs 142, the GI insertion and windowing units 152, and the analog and RF units 154. On the other hand, for non-contiguous 80+80-MHz transmission, each frequency subblock may be processed in parallel by the STBC 135, the CSD per STS inserters 136, the spatial mapper 138, the IDFTs 142, the GI insertion and windowing units 152, and the analog and RF units 154, without merging the frequency subblocks.

The STBC encoder 134 may spread a Spatial Stream (SS) to an STS.

While not shown in the examples of FIGS. 18 and 19, pilot tones may be inserted at specific subcarrier positions.

The CSD per STS inserters 136 may insert a CSD into each STS and frequency segment.

The spatial mapper 138 may map STSs to transmission chains using a spatial mapping/steering matrix (e.g., matrix Q with $N_{TX}$ rows and $N_{STS,total}$ columns where $N_{TX}$ is the number of transmission chains and $N_{STS,total}$ is the total number of STSs).

While not shown in FIGS. 18 and 19, appropriate phase rotation may be applied to each 20-MHz channel.

The IDFTs 142 may calculate an IDFT result for each transmission chain and convert the IDFT result to symbols for the transmission chain. For non-contiguous 80+80-MHz transmission as in the example of FIG. 19, each frequency subblock may be mapped to a separate IDFT and an IDFT result may be calculated.

The GI insertion and window units 152 may insert a GI before a symbol and apply windowing to an edge of the symbol.

The analog and RF units 154 may upconvert a complex baseband waveform to an RF signal according to the center frequency of an intended channel, for each transmission chain and transmit the RF signal.

While BCC encoding is used in the examples of FIGS. 18 and 19, the examples of the present disclosure also include a case in which LDPC encoding is applied instead of BCC encoding. If LDPC encoding is applied, LDPC encoders may be included instead of the BCC encoder parser 106 and the BCC encoders 112. That is, data scrambled by the scrambler 104 may be encoded in the LDPC encoders. The LDPC-coded bits may be rearranged on a block (or subblock) basis in the stream parser 114 and the segment parsers 116 (or in the stream parser 114 with the segment parsers 116 bypassed) and input to the constellation mappers 132. That is, unlike the examples of FIGS. 18 and 19, if LDPC encoding is applied, the BCC interleavers 122 may be omitted. Also, if LDPC encoding is applied, LDPC tone mapping may be applied to constellation-mapped blocks (or subblocks) output from the constellation mappers 132. After the LDPC tone mapping, the LDPC-tone-mapped blocks (or subblocks) may be processed by the STBC encoder 135, the CSD per STS inserters 136, the spatial mapper 138, the IDFTs 142, the GI insertion and windowing units 152, and the analog and RF units 154 (when needed, after being processing in the segment deparsers 134).

Figure 20:
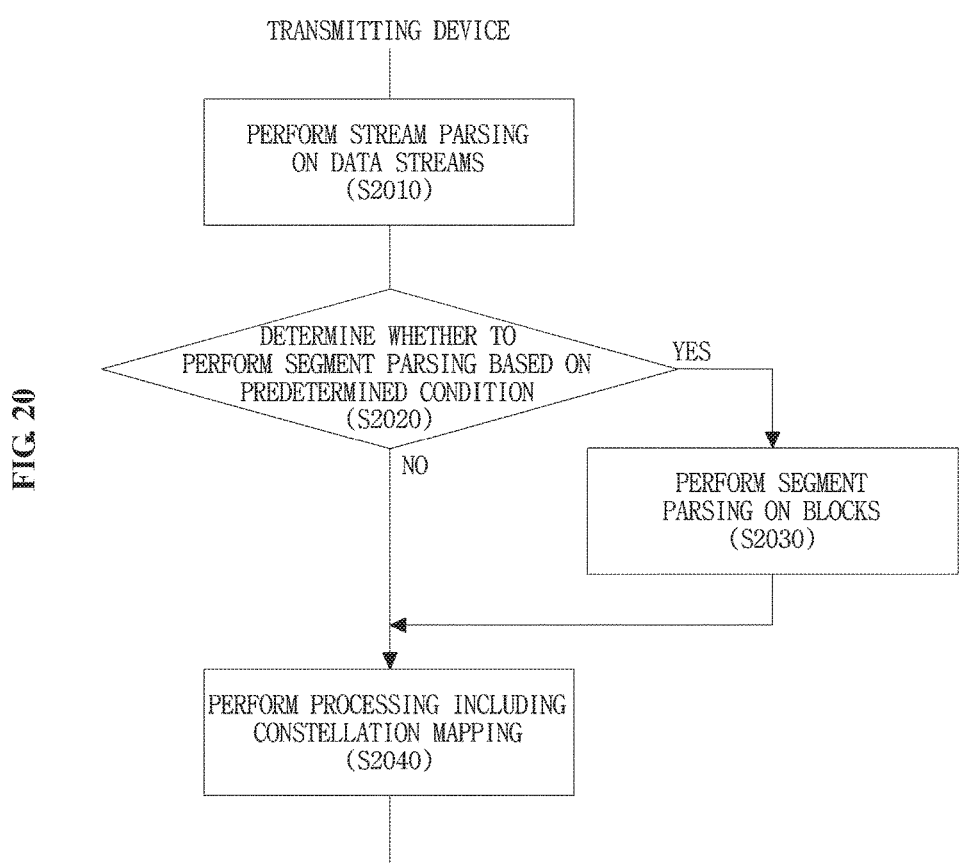
FIG. 20 is a flowchart depicting a method for processing a transmission signal for wideband PPDU transmission according to an example of the present disclosure.

FIG. 20 is a flowchart depicting a method for processing a transmission signal for wideband PPDU transmission according to an example of the present disclosure.

In step S2010, a transmitting device may perform stream paring on data bit streams encoded and output by encoders (for example, BCC encoders or LDPC encoders) of the transmitting device.

In step S2020, the transmitting device may determine whether to perform segment parsing on blocks output through stream parsing based on whether a predetermined condition is satisfied. For example, the predetermined condition may be set based on one or more of a PPDU transmission bandwidth, the size of a frequency unit for transmission signal processing, a PPDU type, and use or non-use of OFDMA. Therefore, the transmitting device may determine whether to perform segment parsing on the blocks output through stream parsing based on one or more of the PPDU transmission bandwidth, the size of a frequency unit for transmission signal processing, the PPDU type, and use or non-use of OFDMA. If a full band channel is divided into a plurality of subchannels and the subchannels are allocated to a plurality of STAs, this case may correspond to use of OFDMA. If a full band channel is not divided into a plurality of subchannels and allocated to one STA, this case may correspond to non-use of OFDMA. If a full band channel is not divided into a plurality of subchannels and is allocated to a plurality of STAs, for MU-MIMO, this case may also correspond to non-use of OFDMA. The full band channel may be a 20-MHz channel, a 40-MHz channel, an 80-MHz channel, an 80+80-MHz channel, or a 160-MHz channel.

If segment parsing is applied, the transmitting device may divide the blocks output through stream parsing into a plurality of subblocks in step S2030. In step S2040, the transmitting device may process the plurality of segment-parsed subblocks, inclusive of constellation mapping.

On the other hand, if segment parsing is not applied, the transmitting device goes from step S2020 to step S2040 in which the transmitting device may process the plurality of segment-parsed subblocks, inclusive of constellation mapping.

While not shown in FIG. 20, PHY padding, scrambling, etc. may further be performed before step S2010. In addition, BCC interleaving (in the case of BCC encoding), constellation mapping, LDPC tone mapping (in the case of LDPC encoding), segment deparsing (when needed), STBC encoding, CSD insertion, spatial mapping, IDFT, CI insertion and windowing, and RF signal conversion may further be performed in step S2040 (refer to the description of FIGS. 2, 18, and 19).

As described in relation to step S2020 of FIG. 20, whether to perform segment parsing (or whether to apply the segment parsers 116) may be determined according to a predetermined condition in an example of the present disclosure. The predetermined condition may be set based on one or more of whether the size of a frequency unit for transmission signal processing is equal to or less than a predetermined threshold (e.g., Y MHz), a PPDU type, and use or non-use of OFDMA.

For example, it may be configured that if the size of the frequency unit for transmission signal processing is equal to or less than Y MHz, segment parsing is not applied, and if the size of the frequency unit for transmission signal processing is larger than Y MHz, segment parsing is applied.

Specifically, on the assumption that Y=80, if the size of the frequency unit for transmission signal processing is equal to or less than 80 MHz, segment parsing may not be applied, and if the size of the frequency unit for transmission signal processing is larger than 80 MHz (i.e., wideband PPDU transmission), segment parsing may be applied. For example, segment parsing may not be applied to 20-MHz, 40-MHz, or 80-MHz PPDU transmission, whereas segment parsing may be applied to 100-MHz, 120-MHz, 160-MHz, 80+20-MHz, 80+40-MHz, or 80+80-MHz PPDU transmission.

More specifically, even in wideband PPDU transmission (e.g., 100-MHz, 120-MHz, 160-MHz, 80+20-MHz, 80+40-MHz, or 80+80-MHz PPDU transmission), the size of a frequency unit for transmission signal processing exceeds 80 MHz and thus segment parsing is applied in SU transmission or MU-MIMO transmission. On the contrary, the size of a frequency unit for transmission signal processing may be equal to or less than 80 MHz in OFDMA transmission.

If SU or MU-MIMO transmission is performed for wideband PPDU transmission, bits corresponding to, for example, a 160-MHz or 80+80-MHz frequency unit may be processed by PHY padding, scrambling, FEC encoding (e.g., BCC encoding or LDPC encoding), and stream parsing. That is, in the case of wideband SU/MU-MIMO PPDU transmission, the size of a frequency unit for transmission signal processing exceeds 80 MHz.

Meanwhile, if OFDMA transmission is performed in wideband PPDU transmission, PHY padding, scrambling, FEC encoding, and streaming parsing are performed on bits corresponding to a frequency unit having a subchannel bandwidth (e.g., 5 MHz, 10 MHz, 20 MHz, 40 MHz, or 80 MHz). That is, in the case of wideband OFDMA PPDU transmission, the size of a frequency unit for transmission signal processing is equal to or less than 80 MHz.

For example, if the bandwidths of four subchannels are 40 MHz, 40 MHz, 40 MHz, and 40 MHz in 160-MHz or 80+80-MHz PPDU transmission, the sizes of frequency units for transmission signal processing are 40 MHz, 40 MHz, 40 MHz, and 40 MHz (i.e., equal to or less than 80 MHz), and thus segment parsing may not be applied. Or if the bandwidths of four subchannels are 80 MHz, 40 MHz, 20 MHz, and 20 MHz, respectively in 160-MHz or 80+80-MHz PPDU transmission, the sizes of frequency units for transmission signal processing are 80 MHz, 40 MHz, 20 MHz, and 20 MHz (i.e., equal to or less than 80 MHz), and thus segment parsing may not be applied.

Also, while segment parsing may be applied to a PPDU type (e.g., a HE PPDU type or a VHT PPDU type) supporting wideband PPDU transmission, segment parsing may not be applied to a PPDU type (e.g., a non-HT PPDU type, a HT-mixed PPDU type, or a HT-greenfield PPDU type) not supporting wideband PPDU transmission. More specifically, segment parsing may be applied to a PPDU type (e.g., the VHT PPDU type) not supporting OFDMA transmission, whereas segment parsing may not be applied to a PPDU type (the HE PPDU type) supporting OFDMA transmission, among the PPDU types supporting wideband PPDU transmission. That is, while segment parsing may be applied to a PPDU type supporting only SU transmission or MU-MIMO transmission (e.g., the VHT PPDU type), segment parsing may not be applied to a PPDU type supporting SU transmission, MU-MIMO transmission, or OFDMA transmission (e.g., the HE PPDU type).

More specifically, in 160-MHz OFDMA PPDU transmission, segment parsing may not be applied to transmission on a subchannel of a bandwidth equal to or less than Y MHz (e.g., 20 MHz, 40 MHz, or 80 MHz) (i.e., if the size of a frequency unit for transmission signal processing is equal to or less than Y MHz), whereas segment parsing may be applied to transmission on a subchannel of a bandwidth larger than Y MHz (e.g., 100 MHz, 120 MHz, or 160 MHz) (i.e., if the size of the frequency unit for transmission signal processing is larger than Y MHz).

As described above, the transmitting device may determine whether to perform or bypass segment parsing in processing a transmission signal, based on one or more of a PPDU transmission bandwidth, the size of a frequency unit for transmission signal processing, a PPDU type, and use or non-use of OFDMA.

If segment parsing is applied, the segment parsers 116 may divide output bits of the stream parser 114 into two subblocks, as illustrated in the examples of FIGS. 18 and 19.

Specifically, the stream parser 114 may process data bit streams received from the FEC encoders (e.g., the BCC encoders 112 or LDPC encoders) in $N_{CBPS}$-bit groups. Each of the groups (that is, $N_{CBPS}$ bits) may be rearranged in $N_{SS}$ blocks, and one block may include $N_{CBPSS}$ bits (in the case of MU transmission, each group may be rearranged in $N_{SS,u}$ blocks, each block including $N_{CBPSS,u}$ bits). Herein, $N_{CBPS}$ represents the number of coded bits per symbol, $N_{CBPSS}$ represents the number of code bits per symbol per spatial stream, $N_{CBPSS,u}$ represents $N_{CBPSS}$ for a specific user, $N_{SS}$ represents the number of spatial streams, and $N_{SS,u}$ represents the number of spatial streams for a specific user.

If the segment parsers 116 are applied to output bits of the stream parser 114, each block may be divided into two subblocks. That is, segment parsing is a process of dividing the $N_{CBPSS}$ bits of each block into two frequency subblocks each including $N_{CBPSS}/2$ bits, expressed as $$y_{k,l} = x_{2s \cdot N_{ES} \lfloor \frac{k}{s \cdot N_{ES}} \rfloor + l \cdot s \cdot N_{ES} + k \, mod(s \cdot N_{ES})}, \quad \text{[Equation 1]}$$

$$k = 0, 1, \ldots, \frac{N_{CBPSS}}{2} - 1$$

In [Equation 1], ⌊ ⌋ represents a floor operation and ⌊z⌋ is a largest integer equal to or less than z. z mod t represents the remainder of dividing integer z by integer t. $x_m$ represents an $m^{th}$ bit of a block including $N_{CBPSS}$ bits (m=0, 1, . . . , $N_{CBPSS}$−1). l is the index of a frequency subblock, which is 0 or 1 (if l=0, this indicates subblock 0 (or a first subblock), and if l=1, this indicates subblock 1 (or a second subblock). $y_{k,l}$ represents bit k of frequency subblock 1. $N_{ES}$ is the number of BCC encoders and s is defined as [Equation 2].

$$s = \max\left\{1, \frac{N_{BPSCS}}{2}\right\}$$ [Equation 2]

In [Equation 2], $N_{BPSCS}$ is the number of coded bits per subcarrier per spatial stream, and max{a,b} represents the larger value between a and b.

If segment parsing is not applied (i.e., the segment parsers 116 are bypassed), the bits (i.e., $N_{CBPSS}$ bits) of one block output from the stream parser 114 may be said to be mapped to one subblock. This may be expressed as [Equation 3].

$$y_{k,l}=x_k, k=0, 1, \ldots, N_{CBPSS}$$ [Equation 3]

In [Equation 3], l represents the index of a frequency subblock and l=0. That is, only the first subblock is assumed, while the second subblock is not assumed. $x_m$ represents an $m^{th}$ bit of a block having $N_{CBPSS}$ bits, and m=0, 1, . . . , $N_{CBPSS}$−1. $y_{k,l}$ represents bit k of frequency subblock 1.

Figure 21:
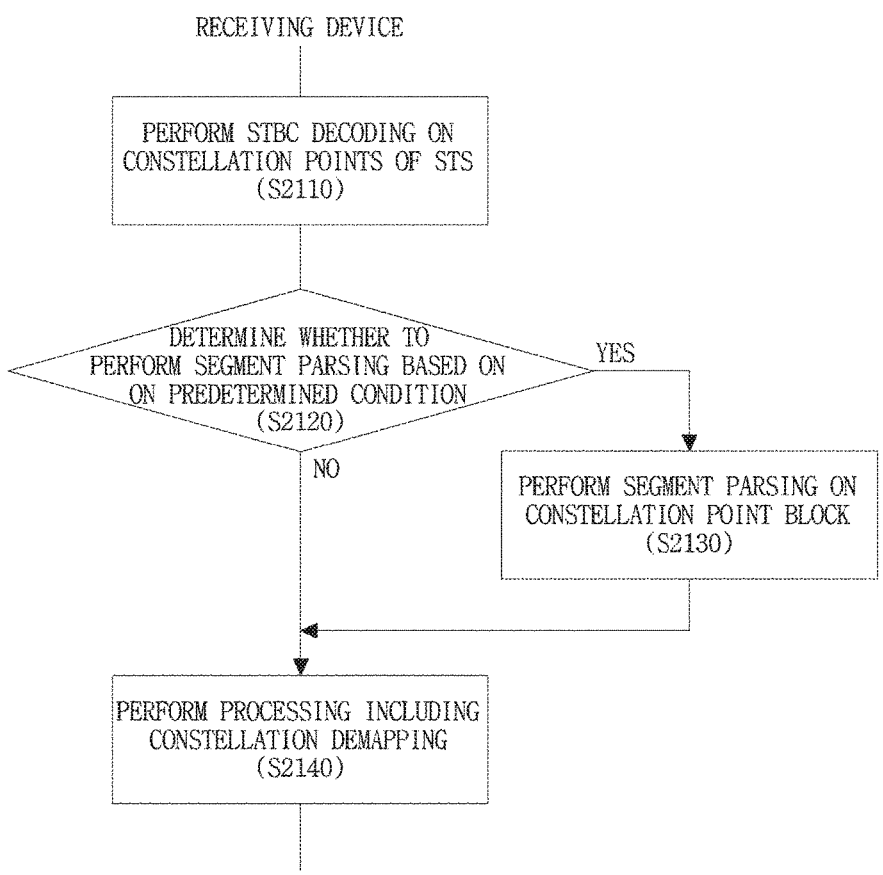
FIG. 21 is a flowchart depicting a method for processing a received signal, for wideband PPDU reception according to an example of the present disclosure.

FIG. 21 is a flowchart depicting a method for processing a received signal, for wideband PPDU reception according to an example of the present disclosure.

Basically, the operation for processing a received wideband PPDU signal illustrated in FIG. 21 may have a reciprocal relationship with the operation for processing a wideband PPDU transmission signal illustrated in FIG. 20.

In step S2110, a receiving device may perform STBC decoding on constellation points of an STS output from a spatial demapper, for despreading the STS to a spatial stream.

In step S2120, the receiving device may determine whether to perform segment parsing on a constellation-point block output from an STBC decoder, depending on whether a predetermined condition is satisfied. For example, the predetermined condition may be set based on one or more of a PPDU reception bandwidth, the size of a frequency unit for reception signal processing, a PPDU type, and use or non-use of OFDMA. Therefore, the receiving device may determine whether to perform segment parsing on the constellation-point block output from the STBC decoder, based on one or more of the PPDU reception bandwidth, the size of the frequency unit for reception signal processing, the PPDU type, and use or non-use of OFDMA.

As described before, when processing a transmission signal, the transmitting device may apply segment parsing according to whether a predetermined condition regarding a PPDU transmission bandwidth, the size of a frequency unit for transmission signal processing, a PPDU type, or use or non-use of OFDMA is satisfied, and then perform segment deparsing after constellation-point mapping. Similarly, the receiving device may apply segment parsing and segment deparsing to the transmission signal to which segment parsing and segment deparsing have been applied, depending on a condition corresponding to the predetermined condition (i.e., a PPDU reception bandwidth, the size of a frequency unit for reception signal processing, a PPDU type, or use or non-use of OFDMA) is satisfied.

If segment parsing is applied, the receiving device may divide a constellation-point block output from the STBC decoder into a plurality of subblocks in step S2130. The plurality of segment-parsed subblocks may be subject to processes including constellation demapping in step S2140.

If segment parsing is not applied, the receiving device may proceed directly to step S2140 in which a constellation-point block output from the STBC decoder may be subject to processes including constellation demapping.

While not shown in FIG. 21, a step for receiving an RF signal, converting the RF signal to one or more symbols, removing GIs from the one or more symbols, performing Fourier transform on the GI-removed symbols, performing spatial demapping on the Fourier-transformed symbols, and converting the symbols to frequency-domain constellation points by removing CSDs may further be performed before step S2110.

Also, the receiving device may further perform a step for generating a plurality of subblocks through LDPC tone demapping (if the received signal is an LDPC-encoded signal), constellation demapping, BCC deinterleaving (if the received signal is a BCC-encoded signal), and segment deparsing (when needed), generating a block through stream deparsing of the plurality of subblocks, and merging streams in step S2140. Further, a stream output from the stream deparser may be decoded by an FEC decoder (for example, a BCC decoder or an LDPC decoder), the decoded data may be descrambled, and a PHY padding may be removed from the descrambled data.

Figure 22:
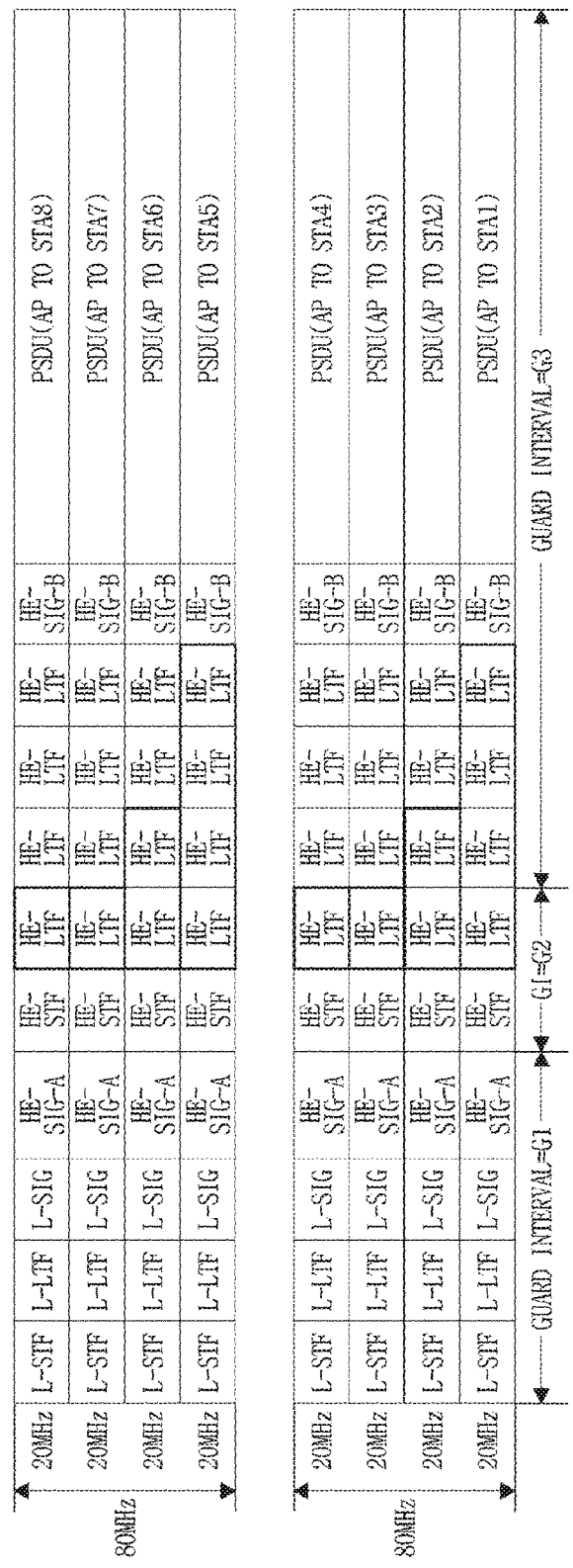
FIGS. 22 and 23 depict example HE PPDU formats in the case where OFDMA transmission is performed using a wideband channel bandwidth.
Figure 23:
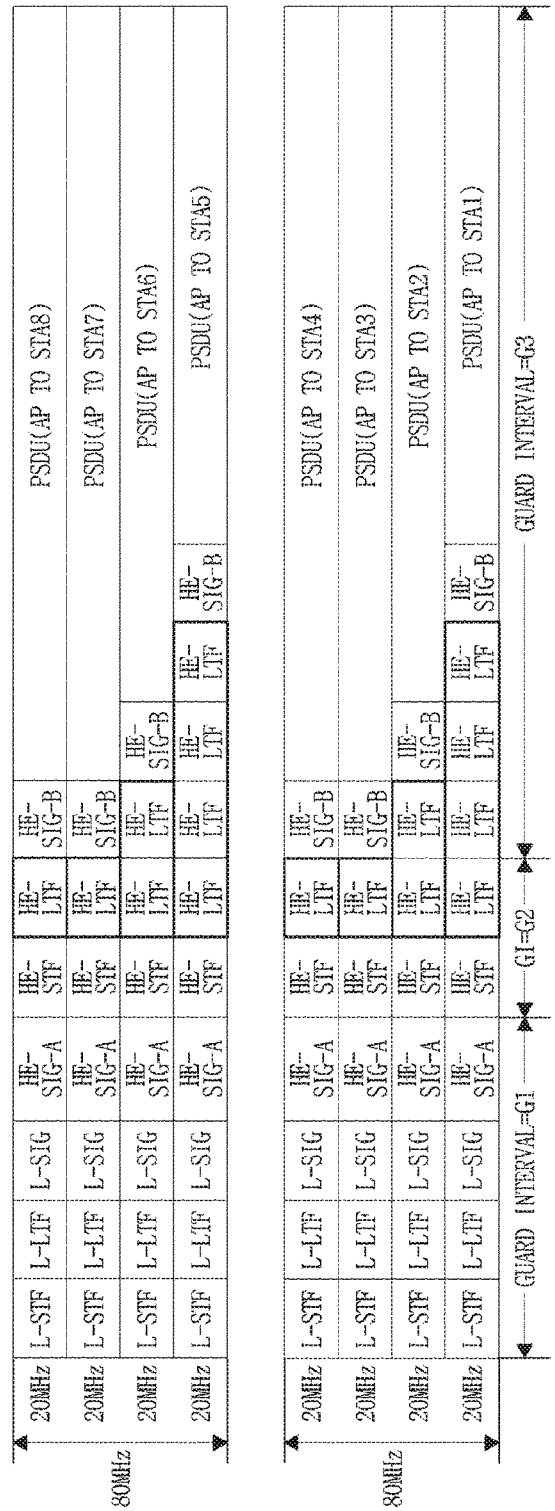

FIGS. 22 and 23 depict example HE PPDU formats in the case where OFDMA transmission is performed using a wideband channel bandwidth.

The example of FIG. 22 illustrates a case in which an AP allocates a 20-MHz subchannel to each of STA1, STA2, STA3, STA4, STA5, STA6, STA7, and STA8 and transmits data units simultaneously to STA1, STA2, STA3, STA4, STA5, STA6, STA7, and STA8 on the allocated 20-MHz subchannels. In the example of FIG. 22, PSDU transmission time points are identical on the plurality of subchannels (e.g., the lengths of HE-LTF sections are equal on the plurality of subchannels). That is, the example of FIG. 22 is an extension of the examples in which PSDU transmission time points are identical on a plurality of subchannels within one 20-MHz channel, among the examples described before with reference to FIGS. 8 to 15, to a plurality of 20-MHz channels. The description of OFDMA transmission on a plurality of subchannels within a 20-MHz channel may be extended to PPDU transmission in a 160-MHz or 80+80-MHz channel bandwidth, and each 20-MHz channel may have the same OFDM symbol duration and the same GI.

The example of FIG. 23 illustrates a case in which an AP allocates a 20-MHz subchannel to each of STA1, STA2, STA3, STA4, STA5, STA6, STA7, and STA8 and transmits data units simultaneously to STA1, STA2, STA3, STA4, STA5, STA6, STA7, and STA8 on the allocated 20-MHz subchannels. In the example of FIG. 23, PSDU transmission time points are not identical on the plurality of subchannels (e.g., the lengths of HE-LTF sections are not equal on the plurality of subchannels). That is, the example of FIG. 23 is an extension of the examples in which PSDU transmission time points are not identical on a plurality of subchannels within one 20-MHz channel, among the examples described before with reference to FIGS. 8 to 15, to a plurality of 20-MHz channels. The description of OFDMA transmission on a plurality of subchannels within a 20-MHz channel in these examples may be extended to PPDU transmission in a 160-MHz or 80+80-MHz channel bandwidth, and each 20-MHz channel may have the same OFDM symbol duration and the same GI.

As in the examples of FIGS. 22 and 23, it may be assumed that a wideband channel bandwidth (e.g., a 160-MHz or 80+80-MHz channel bandwidth) is divided into a plurality of subchannels, the plurality of subchannels are allocated to a plurality of STAs, and simultaneous transmission (i.e., OFDMA HE PPDU transmission) to the STAs is performed.

On the other hand, unlike the examples of FIGS. 22 and 23, it may be assumed that if a wideband channel width (160 MHz or 80+80 MHz) is allocated only to one STA and a wideband HE PPDU is transmitted to the STA (i.e., SU PPDU transmission), or an equal channel bandwidth is allocated to each of a plurality of STAs and different spatial streams are allocated and transmitted simultaneously to the STAs (i.e., MU-MIMO PPDU transmission).

In the case of wideband (e.g. 160 MHz or 80+80 MHz) SU/MU-MIMO PPDU transmission, bits output from the stream parser 114 may be divided into a plurality of frequency subblocks through the segment parsers 116, and the bits of each frequency subblock may be interleaved through the BCC interleavers 122, converted through the constellation mappers 132, and then transmitted (or, if LDPC encoding is applied, the bits output from the stream parser 114 may be divided into the plurality of frequency subblocks through the segment parsers 116, and the bits of each frequency subblock may be converted through the constellation mappers 132, and then transmitted (the BCC interleavers 122 are omitted)).

In the case of wideband (e.g. 160 MHz or 80+80 MHz) OFDMA PPDU transmission, bits output from the stream parser 114 may be interleaved through the BCC interleavers 122 and converted through the constellation mappers 132, for each of subchannels allocated to a plurality of STAs, and then transmitted (or, if LDPC encoding is applied, the bits output from the stream parser 114 may be converted through the constellation mappers 132, LDPC-tone-mapped, and then transmitted).

As described above, the segment parsers 116 may be used for wideband SU/MU-MIMO PPDU transmission, whereas the segment parsers 116 may not be used for wideband OFDMA PPDU transmission.

That is, in wideband SU/MU-MIMO PPDU transmission, bits output from the stream parser 114 may be divided into a plurality of frequency subblocks in the segment parsers 116, and the frequency subblocks may be converted in the constellation mappers 132 and then transmitted.

On the other hand, in wideband OFDMA PPDU transmission, bits output from the stream parser 114 may be converted directly in the constellation mappers 132 and then transmitted. In 160-MHz or 80+80-MHz OFDMA PPDU transmission, bits output from the stream parser 114 may be configured separately for the respective subchannels. Specifically, the stream parser 114 may divide input bits (i.e., encoded bits) to be transmitted to each user into spatial streams. More specifically, the single stream parser 114 may receive bits distinguished from each other for the respective subchannels, and divide input bits for each subchannel into spatial streams.

For example, if a 160-MHz channel bandwidth is allocated to one STA, for transmission, the segment parsers 116 may be used. On the other hand, if a 160-MHz channel bandwidth is divided into a plurality of subchannels and the subchannels are allocated to a plurality of STAs, for simultaneous transmission, the segment parsers 116 may not be used.

Figure 24:
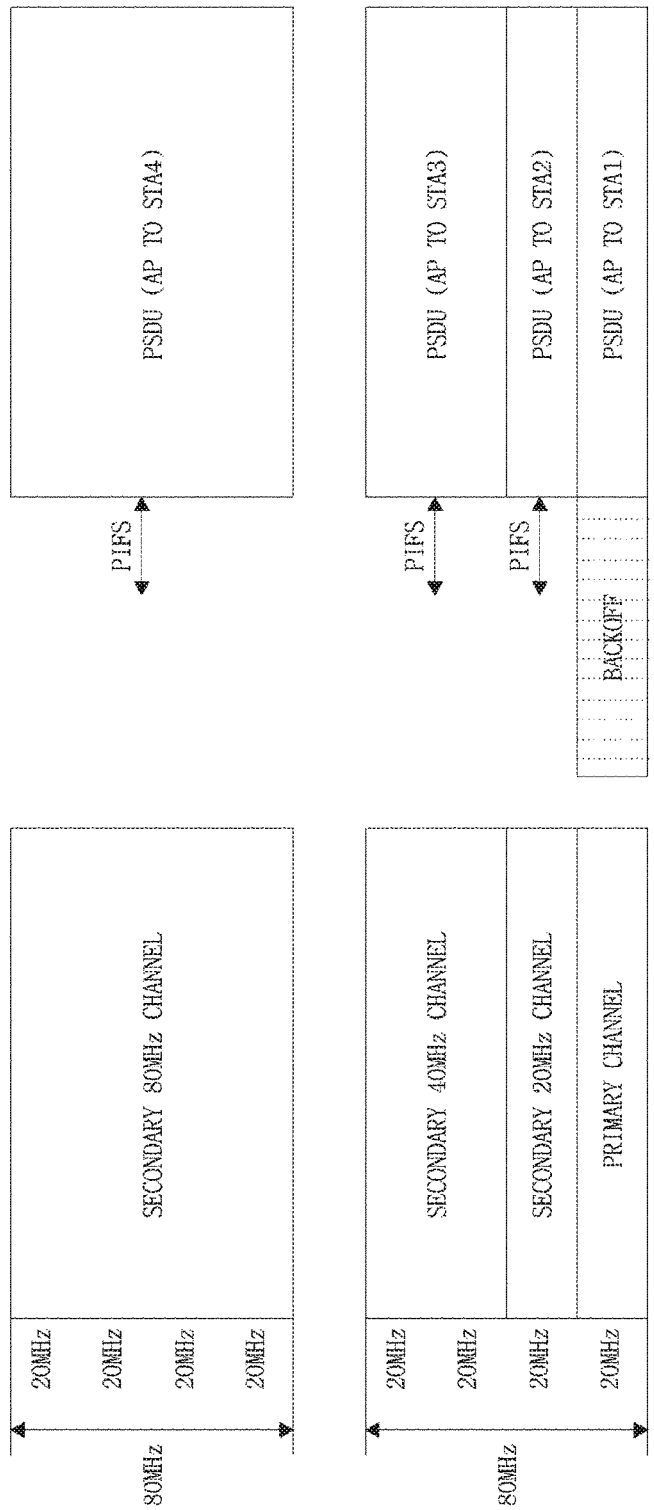
FIG. 24 depicts an example channel access operation for wideband OFDMA PPDU transmission.

FIG. 24 depicts an example channel access operation for wideband OFDMA PPDU transmission.

In the example of FIG. 24, a backoff operation may be performed on a primary channel. Upon expiration of a backoff timer, the CCA states of a secondary 20-MHz channel, a secondary 40-MHz channel, and a secondary 80-MHz channel are monitored during a PIFS. Then, an HE PPDU transmission bandwidth may be determined for an idle-state secondary channel.

That is, as in the examples of determining a transmission bandwidth (or a transmission channel width) by a STA following a contention-based channel access scheme (e.g., EDCA), described before with reference to FIGS. 16 and 17, if a STA is allowed to start a TXOP and has at least one MSDU to be transmitted for the AC of the allowed TXOP, the STA may perform one of a), b), c), d), and e). As defined for 160-MHz or 80+80-MHz mask PPDU transmission in a), if the secondary channel, the secondary 40-MHz channel, and the secondary 80-MHz channel are idle during a PIFS shortly before the start of the TXOP, a 160-MHz or 80+80-MHz mask PPDU may be transmitted.

As illustrated in the example of FIG. 24, if wideband (e.g., 160-MHz or 80+80-MHz) HE PPDU transmission is possible, an AP may determine whether to transmit a wideband HE PPDU by allocating a wideband PPDU transmission bandwidth to one or more STAs in a SU or MU-MIMO transmission scheme, or by allocating a plurality of subchannels to a plurality of STAs in an OFDMA transmission scheme.

If the wideband HE PPDU is transmitted in the SU/MU-MIMO transmission scheme, a PSDU may be divided into a plurality of subblocks (e.g., two subblocks) using segment parsers and then transmitted.

On the other hand, If the wideband HE PPDU is transmitted in the OFDMA transmission scheme, PSDUs may be divided into subchannels (or frequency subblocks) for a plurality of respective STAs without using segment parsers and then transmitted.

In the example of FIG. 24, an AP transmitting a wideband HE PPDU allocates a 20-MHz subchannel, a 20-MHz subchannel, a 40-MHz subchannel, and an 80-MHz subchannel respectively to STA1, STA2, STA3, and STA4 and simultaneously transmit PSDUs to STA1, STA2, STA3, and STA4 on the allocated subchannels. Segment parsing is not performed on the PSDU transmitted to each of the STAs.

Figure 25:
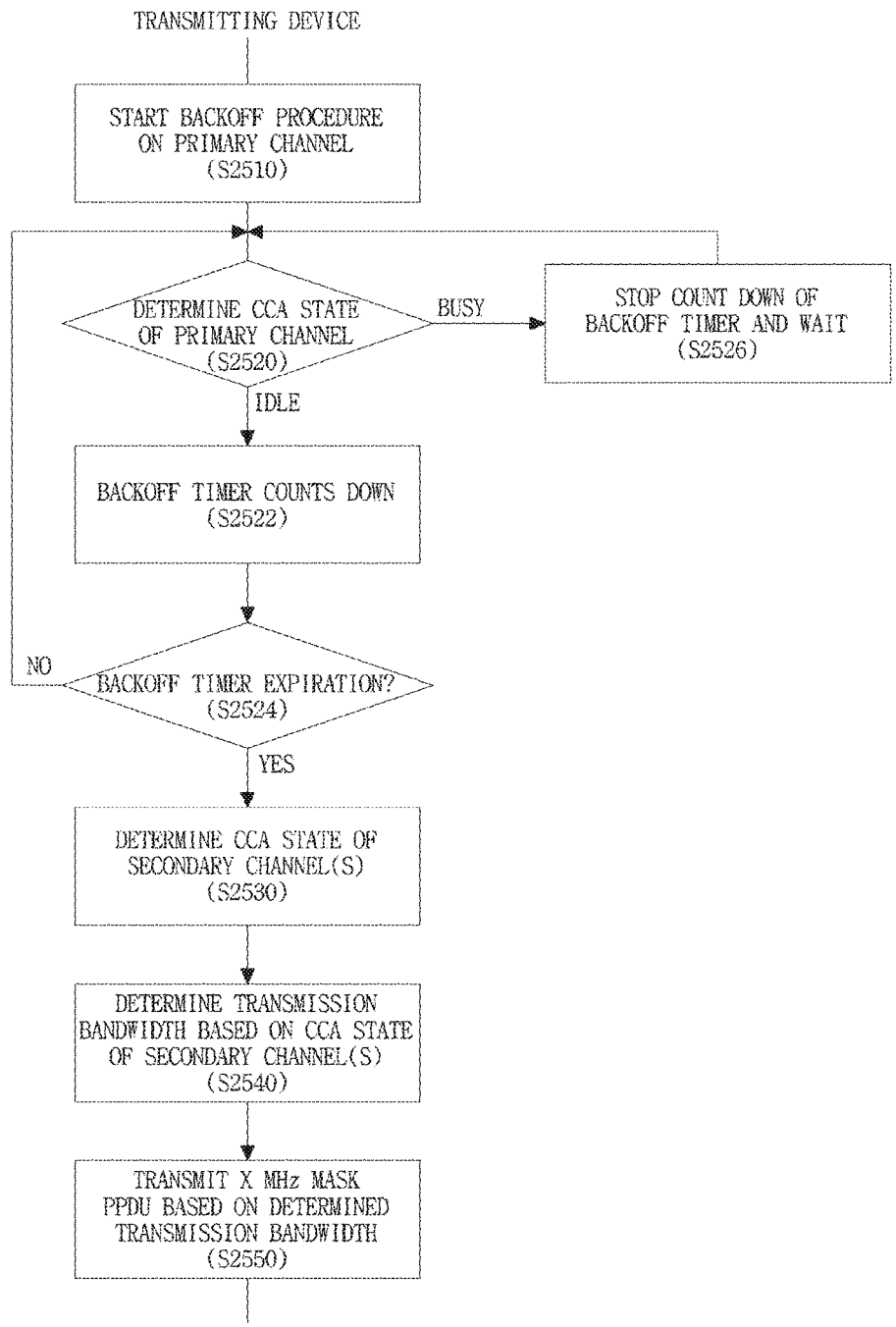
FIG. 25 is a flowchart depicting a method for determining a transmission bandwidth for wideband PPDU transmission according to an example of the present disclosure.

FIG. 25 is a flowchart depicting a method for determining a transmission bandwidth for wideband PPDU transmission according to an example of the present disclosure.

The foregoing examples are based on the assumption that when a HE PPDU is transmitted in a wideband transmission bandwidth (e.g., a channel bandwidth exceeding 80 MHz), a contiguous 160-MHz or non-contiguous 80+80-MHz channel bandwidth is used. Now, a description will be given of a method for supporting transmission of a HE PPDU with a channel bandwidth exceeding 80 MHz, when only a part of a secondary 80-MHz channel is idle according to an additional example of the present disclosure.

For example, if the primary channel, the secondary 20-MHz channel, and the secondary 40-MHz channel are idle, a contiguous 100-MHz (or non-contiguous 80+20-MHz), contiguous 120-MHz (or non-contiguous 80+40-MHz), or contiguous 160-MHz (or non-contiguous 80+80-MHz) mask PPDU may be transmitted depending on whether the whole or a part of frequency segments of the secondary 80-MHz channel are idle.

That is, only a 160-MHz or 80+80-MHz channel bandwidth may be supported as a wideband transmission bandwidth, while a 100-MHz, 80+20-MHz, 120-MHz, or 80+40-MHz channel bandwidth may not be supported as a wideband transmission bandwidth in the channel access scheme described before with reference to FIG. 16, 17, or 24. However, a 100-MHz, 80+20-MHz, 120-MHz, 80+40-MHz, 160-MHz, or 80+80-MHz channel bandwidth may be supported as a wideband transmission bandwidth in the additional example of the present disclosure. Therefore, the use efficiency of channel resources can be increased.

Hereinafter, a method for determining a HE PPDU transmission bandwidth according to an additional example of the present disclosure will be described in detail with reference to FIG. 25.

In the example of FIG. 25, upon generation of a transmission frame, a transmitting device may determine a transmission bandwidth (or a transmission channel width) according to a contention-based channel access scheme (e.g., EDCA).

In step S2510, the transmitting device may start a backoff procedure on the primary channel to acquire a TXOP. Specifically, after the transmitting device determines that the CCA state of the primary channel is idle by sensing the primary channel during a time interval of a DIFS or AIFS[i], the transmitting device may start the backoff procedure according to a selected random backoff count.

In step S2520, the transmitting device may determine whether the CCA state of the primary channel is idle or busy during a time period corresponding to one backoff slot. If the CCA state of the primary channel is the idle state, the transmitting device may count down the backoff timer by 1 in step S2522 and determine whether the backoff timer has expired (i.e., the backoff timer has reached 0) in step S2524. If the CCA state of the primary channel is the busy state, the transmitting device may stop the count-down and wait in step S2526 and return to step S2520 in which the transmitting device may determine again whether the primary channel is idle.

If the transmitting device determines that the backoff timer has reached 0 in step S2522, the transmitting device may determine whether the CCA state(s) of secondary channel(s) are the idle or busy state at a corresponding time point (i.e., a starting transmission timing) in step S2530. Specifically, once the starting transmission timing is determined for the primary channel, the transmitting device may determine whether the CCA state(s) of the secondary channel(s) are the idle state during a PIFS shortly before the starting transmission timing.

In step S2540, the transmission bandwidth may be determined based on the CCA state(s) of the secondary channel(s) determined in step S2530. More specifically, if the transmitting device is allowed to start a TXOP and has at least one MSDU to be transmitted for the AC of the allowed TXOP, the transmitting device may determine a transmission bandwidth by performing one of the following a1), a2), a3), b), c), d), and e).

a1) If the secondary channel, the secondary 40-MHz channel, and the secondary 80 MHz in 80-MHz channel are idle during a PIFS shortly before the start of a TXOP, a 160-MHz or 80+80-MHz mask PPDU may be transmitted.

a2) If the secondary channel, the secondary 40-MHz channel, and the secondary 40 MHz in 80-MHz channel are idle during a PIFS shortly before the start of a TXOP, a 120-MHz or 80+40-MHz mask PPDU may be transmitted.

a3) If the secondary channel, the secondary 40-MHz channel, the secondary 40 MHz in 80-MHz channel, and the secondary 20 MHz in 80-MHz channel are idle during a PIFS shortly before the start of a TXOP, a 100-MHz or 80+20-MHz mask PPDU may be transmitted.

b) If both the secondary channel and the secondary 40-MHz channel are idle during a PIFS shortly before the start of a TXOP, an 80-MHz mask PPDU may be transmitted on the primary 80-MHz channel.

c) If the secondary channel is idle during a PIFS shortly before the start of a TXOP, a 40-MHz mask PPDU may be transmitted on the primary 40-MHz channel.

d) A 20-MHz mask PPDU may be transmitted on the primary 20-MHz channel.

e) A channel access attempt may be re-started by performing a backoff procedure, as in the case where a medium on a primary channel is indicated as busy by one of physical carrier sensing and virtual carrier sensing and a backoff timer has a value of 0.

In step S2550, an X-MHz mask PPDU (e.g., X=20, 40, 80, 100, 120, or 160) may be transmitted on the primary channel and the secondary channel(s) determined to be idle in step S2530.

Meanwhile, similarly to the description of FIG. 10, if a HE PPDU transmission channel is configured with non-contiguous channels (e.g., non-contiguous 80+20 MHz, non-contiguous 80+40 MHz, or non-contiguous 80+80 MHz) in HE PPDU transmission using the whole or a part of frequency segments of the secondary 80-MHz channel, no subchannel may be allocated with overlap between the plurality of non-contiguous channels. That is, if the HE PPDU transmission channel includes non-contiguous first and second channels, one subchannel may not be allocated across a part of the first channel and a part of the second channel.

For example, if two 80-MHz channels are non-contiguous in FIG. 24, the AP may not allow allocation of the secondary 40-MHz channel and the second 40 MHz in 80 MHz channel to allocate an 80-MHz subchannel to STA3.

Figure 26:
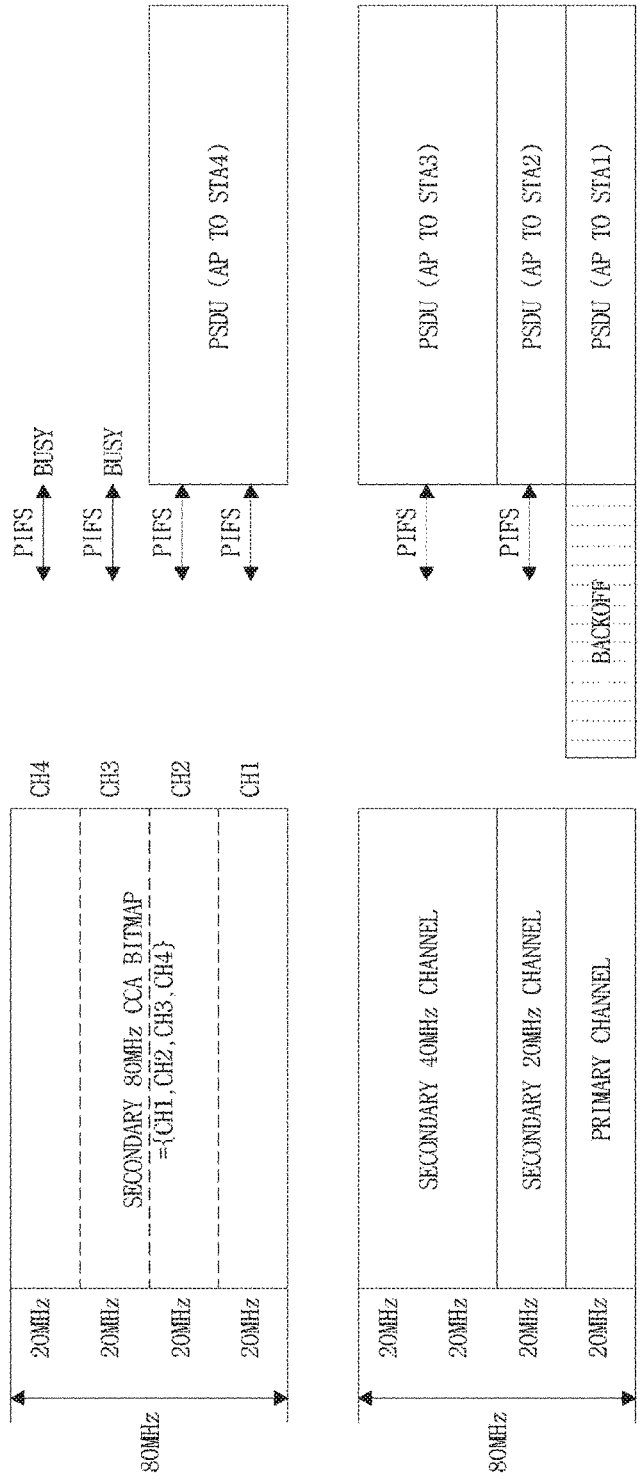
FIG. 26 depicts another example of a channel access operation for wideband OFDMA PPDU transmission.

FIG. 26 depicts another example of a channel access operation for wideband OFDMA PPDU transmission.

While the AP monitors the CCA state of the whole secondary 80-MHz channel during a PIFS shortly before a starting transmission timing (i.e., a time point at which a backoff timer has expired on the primary channel) in the example of FIG. 24, the AP monitors the CCA states of the secondary 20 MHz in 80-MHz channel, the secondary 40 MHz in 80-MHz channel, and the secondary 80 MHz in 80-MHz channel, separately in the example of FIG. 26. A HE PPDU transmission bandwidth that the AP determines based on the CCA state of each of the frequency segments of the secondary 80-MHz channel may be 100 MHz, 120 MHz, or 160 MHz.

To determine the CCA states of the secondary 20 MHz in 80-MHz channel, the secondary 40 MHz in 80-MHz channel, and the secondary 80 MHz in 80-MHz channel, CCA bitmap information about the frequency segments of the secondary 80-MHz channel may be used. Specifically, the CCA bitmap information may include 4 bits indicating the respective four 20-MHz channels of the secondary 80-MHz channel (i.e., the frequency segments of the secondary 80-MHz channel). For example, the first, second, third, and fourth bit positions of the 4-bit bitmap may indicate the CCA states (idle/busy) of the four 20-MHz channels in the order of lowest to highest frequencies in the secondary 80-MHz channel. If one bit value is 0, this may indicate the idle state and if it is 1, this may indicate the busy state (or if one bit value is 1, this may indicate the idle state and if it is 0, this may indicate the busy state). For example, the bitmap information may be generated in the PHY and transmitted to the MAC in the transmitting device transmitting a wideband HE PPDU or may be generated based on CCA states transmitted from the MAC to the PHY in the transmitting device.

FIG. 26 illustrates an example in which a secondary 80-MHz CCA bitmap is configured as {CH1, CH2, CH3, CH4}. It is assumed that four 20-MHz channels of the secondary 80-MHz channel are indexed with CH1, CH2, CH3, and CH4, respectively in an ascending order of frequency. If the secondary 40 MHz in 80 MHz channel is idle during a PIFS shortly before expiration of a backoff timer, the secondary 80-MHz CCA bitmap may indicate {idle, idle, busy, busy}. The AP may determine a transmission bandwidth for a HE PPDU to be contiguous 120 MHz (or non-contiguous 80+40 MHz), using the secondary 80-MHz CCA bitmap.

In the example of FIG. 26, the AP allocates a 20-MHz subchannel, a 20-MHz subchannel, a 40-MHz subchannel, and a 40-MHz subchannel, respectively to STA1, STA2, STA3, and STA4 and simultaneously transmits PSDUs to STA1, STA2, STA3, and STA4. Segment parsing may not be performed on the PSDU transmitted to each STA.

FIG. 27 is a block diagram of a transmitting signal processing unit for OFDMA PPDU transmission according to the present disclosure.

For example, FIG. 27 may be a block diagram of a transmitting signal processing unit in a transmitting STA that divides channel bandwidths of 20 MHz, 40 MHz, 80 MHz, 160 MHz into a plurality of subchannels, allocates the subchannels to a plurality of STAs, and simultaneously transmits a HE PPDU to the STAs. In FIG. 27, the transmitting STA may be, for example, an AP.

In FIG. 27, signals are simultaneously transmitted to $N_{user}$ users (e.g., User_0, . . . , User_$N_{user}$-1). The same encoding scheme or different encoding schemes may be applied to the plurality of users. For example, LDPC encoding may be applied to a signal transmitted to each of the $N_{user}$ users. Or BCC encoding may be applied to a signal transmitted to each of the $N_{user}$ users. Or LDPC encoding may be applied to a part of the $N_{user}$ users, whereas BCC encoding may be applied to the remaining part of the $N_{user}$ users. For example, LDPC encoding may be applied to a signal transmitted to User_0 and BCC encoding may be applied to a signal transmitted to User_$N_{user}$-1.

As illustrated in FIG. 27, a plurality of spatial streams may be generated for each user through processing in the PHY padder 102, the scrambler 104, the BCC encoders 112 or an LDPC encoder 113, and the stream parser 114. The respective spatial streams may be processed in the constellation mappers 132 and the CSD per STS inserters 136. If the BCC encoders 112 are used, BCC interleaving may be performed before constellation mapping. If the LDPC encoder 113 are used, LDPC tone mapping of LDPC tone mappers 133 may be performed before constellation mapping of the constellation mappers 132.

For example, if LDPC encoding is applied for User_0, LDPC encoded bits may be output by processing input bits to be transmitted to User_0 in the PHY padder 102, the scrambler 104, and the LDPC encoder 113. A plurality of spatial streams may be generated by processing the LDPC encoded bits in the stream parser 114. That is, a plurality of spatial streams may be generated for each user. The respective spatial streams may be input to segment deparsers 134-1 to 134-n after being processed in the constellation mappers 132, the LDPC tone mappers 133, and the CSD per STS inserters 136. While CSD per STC insertion is not performed on some stream in the example of FIG. 27, it may be said that a CSD of 0 is inserted in the stream.

For example, if LDPC encoding is applied for User_$N_{user}$-1, BCC encoded bits may be output by processing input bits to be transmitted to User_$N_{user}$-1 in the PHY padder 102, the scrambler 104, the BCC encoder parser 106, and the BCC encoders 112. A plurality of spatial streams may be generated by processing the BCC encoded bits in a stream parser 116. That is, a plurality of spatial streams may be generated for each user. The respective spatial streams may be input to the segment deparsers 134-1 to 134-n after being processed in the BCC interleavers 122, the constellation mappers 132, and the CSD per STS inserters 136.

The segment deparsers 134-1, . . . , 134-n may perform segment deparsing on n respective STSs STS_1, . . . , STS_n. The segment deparsers 134-1, . . . , 134-n may configure one contiguous frequency segment block with a plurality of subchannels allocated to a plurality of users. Once the contiguous frequency segment block is configured through the segment deparsers 134-1, . . . , 134-n, modulated waveforms may be transmitted to the plurality of users (or STAs) by subjecting the respective STSs to spatial mapping, IDFT, GI insertion and windowing, and analog and RF processing in the spatial mapper 138, the IDFTs 142, the GI insertion and windowing units 152, and the analog and RF units 154, for a total channel bandwidth (e.g., 20 MHz, 40 MHz, 80 MHz, or 160 MHz) in which the PPDU is transmitted.

The segment deparsers 134-1, . . . , 134-n may be used in the case where a 160-MHz channel bandwidth is allocated to one STA, for transmission, and in the case where the 160-MHz channel bandwidth is divided into a plurality of subchannels and the subchannels are allocated to a plurality of STAs, for simultaneous transmission. Although different implementation algorithms may be available for the segment deparsers 134-1, . . . , 134-n, they are common in that one contiguous frequency segment block is configured with divided frequency segment blocks.

While the afore-described example methods of the present disclosure have been described as a series of operations for simplicity of description, this does not limit the sequence of steps. In some embodiments, steps may be performed at the same time or in a different sequence. All of the example steps are not always necessary to implement the method proposed by the present disclosure.

The foregoing embodiments of the present disclosure may be implemented separately or combinations of two or more of the embodiments may be implemented simultaneously, for the afore-described example methods of the present disclosure.

The present disclosure includes an apparatus for processing or performing the method of the present disclosure (e.g., the wireless device and its components described with reference to FIGS. 1, 2, and 3).

The present disclosure includes software or machine-executable instructions (e.g., an operating system (OS), an application, firmware, a program, etc.) for executing the method of the present disclosure in a device or a computer, and a non-transitory computer-readable medium storing the software or instructions that can be executed in a device or a computer.

While various embodiments of the present disclosure have been described in the context of an IEEE 802.11 system, they are applicable to various mobile communication systems.

What is claimed is:

1. A method for transmitting a Physical layer Protocol Data Unit (PPDU) in a wireless local area network, the method comprising:
   determining whether Orthogonal Frequency Division Multiple Access (OFDMA) is used by the PPDU;
   selectively performing segment parsing on blocks received from either a stream parser or a Space-Time Block Coding (STBC) decoder based on whether Orthogonal Frequency Division Multiple Access (OFDMA) is used by the PPDU, wherein the segment parsing, when performed, outputs frequency subblocks; and
   transmitting the PPDU with the frequency subblocks when segment parsing is performed.

2. The method according to claim 1, wherein the segment parsing is further selectively performed based on at least one of a transmission bandwidth of the PPDU, a resource unit size allocated in the PPDU, and a type of the PPDU.

3. The method according to claim 2, wherein the segment parsing is bypassed when the transmission bandwidth of the PPDU is equal to or less than 80 MHz.

4. The method according to claim 2, wherein the segment parsing is bypassed when a resource unit size allocated in the PPDU has a size equal to or less than 80 MHz.

5. The method according to claim 1, wherein the segment parsing is bypassed when OFDMA is used by the PPDU.

6. The method according to claim 2, wherein the segment parsing is performed when the transmission bandwidth of the PPDU is greater than 80 MHz, the resource unit size allocated in the PPDU is greater than 80 MHz, OFDMA is not applied, and the type of the PPDU is a Very High Throughput (VHT) PPDU type or a High Efficiency (HE) PPDU type.

7. The method according to claim 1, further comprising:
   determining a channel state of each of one or more portions of a secondary channel; and
   determining a transmission bandwidth for the PPDU, wherein the transmission bandwidth includes at least one of the one or more portions of the secondary channel, and
   wherein the PPDU is transmitted on the determined transmission bandwidth.

8. The method according to claim 7, wherein the secondary channel is a secondary 80 MHz channel.

9. The method according to claim 8, wherein the transmission bandwidth includes a primary channel, a secondary 20 MHz channel, a secondary 40 MHz channel, and at least one of the one or more portions of the secondary 80 MHz channel.

10. The method according to claim 9, wherein the transmission bandwidth is determined as one of contiguous 100 MHz, non-contiguous 80+20 MHz, contiguous 120 MHz, non-contiguous 80+40 MHz, contiguous 160 MHz, or non-contiguous 80+80 MHz.

11. The method according to claim 10, wherein a channel state of each portion of the secondary channel is determined during an interval immediately preceding a start of a transmission opportunity (TXOP).

12. The method according to claim 11, wherein the TXOP is obtained based on a channel state of a primary channel.

13. The method according to claim 12, wherein the channel state of the primary channel is a Clear Channel Assessment (CCA) state indicating an idle state or a busy state.

14. The method according to claim 13, wherein the interval corresponds to a PIFS (Point coordination function Inter-Frame Space) time.

15. A non-transitory machine-readable storage medium that includes instructions, which when executed by a processor of a computer system, causes the computer system to:
   determine whether Orthogonal Frequency Division Multiple Access (OFDMA) is used by a Physical layer Protocol Data Unit (PPDU);
   selectively perform segment parsing on blocks received from either a stream parser or a Space-Time Block Coding (STBC) decoder based on whether Orthogonal Frequency Division Multiple Access (OFDMA) is used by the PPDU, wherein the segment parsing, when performed, outputs frequency subblocks; and
   transmit the PPDU with the frequency subblocks when segment parsing is performed.

16. The non-transitory machine-readable storage medium according to claim 15, wherein the segment parsing is bypassed when OFDMA is used by the PPDU.

17. The non-transitory machine-readable storage medium according to claim 15, wherein the segment parsing is further selectively performed based on at least one of a transmission bandwidth of the PPDU, a resource unit size allocated in the PPDU, and a type of the PPDU.

18. A computer system comprising:
   a processor; and
   a memory unit coupled to the processor, wherein the memory unit includes instructions that when executed by the processor cause the computer system to:
   determine whether Orthogonal Frequency Division Multiple Access (OFDMA) is used by a Physical layer Protocol Data Unit (PPDU);
   selectively perform segment parsing on blocks received from either a stream parser or a Space-Time Block Coding (STBC) decoder based on whether Orthogonal Frequency Division Multiple Access (OFDMA) is used by the PPDU, wherein the segment parsing, when performed, outputs frequency subblocks; and
   transmit the PPDU with the frequency subblocks when segment parsing is performed.

19. The computer system according to claim 18, wherein the segment parsing is bypassed when OFDMA is used by the PPDU.

20. The computer system according to claim 18, wherein the segment parsing is further selectively performed based on at least one of a transmission bandwidth of the PPDU, a resource unit size allocated in the PPDU, and a type of the PPDU.

* * * * *